May 21, 1968 J. DAUGHERTY Re. 26,393

HIGH-SPEED FLOOR TYPE CONTOUR MILLING MACHINE

Original Filed Nov. 9, 1954 24 Sheets-Sheet 1

Inventor
Jesse Daugherty
Carlson, Pitzner, Hubbard + Wolfe
Attorneys

HIGH-SPEED FLOOR TYPE CONTOUR MILLING MACHINE

Original Filed Nov. 9, 1954 24 Sheets-Sheet 2

Inventor
Jesse Daugherty
Carlson, Pitzner, Hubbard + Wolfe
Attorneys

HIGH-SPEED FLOOR TYPE CONTOUR MILLING MACHINE

Original Filed Nov. 9, 1954 24 Sheets-Sheet 3

Inventor
Jesse Daugherty
Carlson, Pitzner, Hubbard & Wolfe
Attorneys

HIGH-SPEED FLOOR TYPE CONTOUR MILLING MACHINE
Original Filed Nov. 9, 1954 24 Sheets-Sheet 4
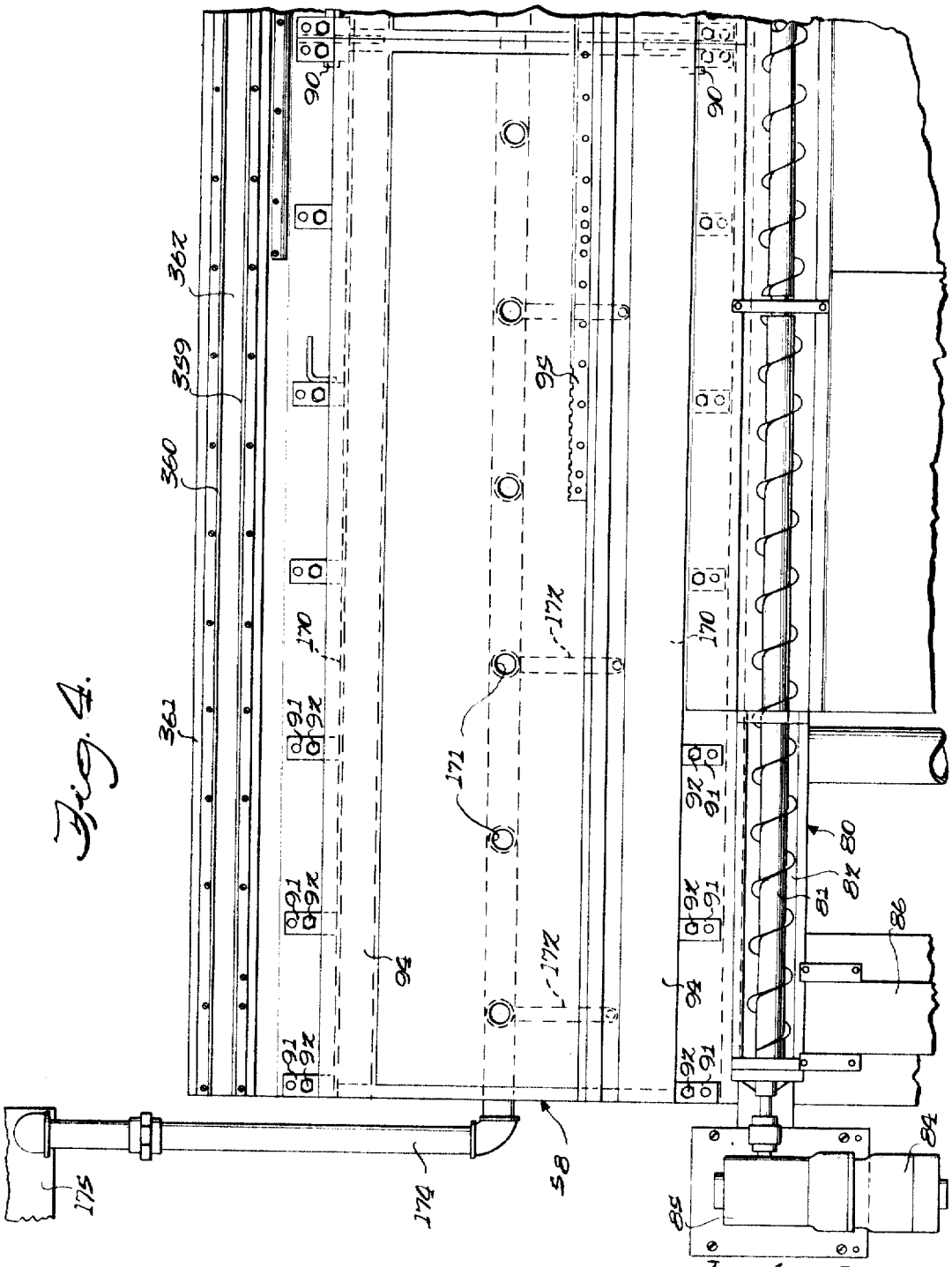
Inventor
Jesse Daugherty,
Carlson, Pitzner, Hubbard & Wolfe
Attorneys

HIGH-SPEED FLOOR TYPE CONTOUR MILLING MACHINE

Original Filed Nov. 9, 1954 24 Sheets-Sheet 5

Inventor
Jesse Daugherty
Carlson, Pitzner, Hubbard & Wolfe
Attorneys

HIGH-SPEED FLOOR TYPE CONTOUR MILLING MACHINE

Original Filed Nov. 9, 1954 24 Sheets-Sheet 6

Inventor
Jesse Daugherty
Carlson, Pitzner, Hubbard & Wolfe
Attorneys

HIGH-SPEED FLOOR TYPE CONTOUR MILLING MACHINE

Original Filed Nov. 9, 1954 24 Sheets-Sheet 7

HIGH-SPEED FLOOR TYPE CONTOUR MILLING MACHINE

Original Filed Nov. 9, 1954 24 Sheets-Sheet 8

Inventor
Jesse Daugherty
Carlson, Pitzner,
Hubbard + Wolfe
Attorneys

HIGH-SPEED FLOOR TYPE CONTOUR MILLING MACHINE

Original Filed Nov. 9, 1954 24 Sheets-Sheet 9

Inventor
Jesse Daugherty
Carlson, Pitzner, Hubbard & Wolfe
Attorneys

HIGH-SPEED FLOOR TYPE CONTOUR MILLING MACHINE

Original Filed Nov. 9, 1954 24 Sheets-Sheet 10

Inventor
Jesse Daugherty
Carlson, Pitzner, Hubbard + Wolfe
Attorneys

HIGH-SPEED FLOOR TYPE CONTOUR MILLING MACHINE

Original Filed Nov. 9, 1954 24 Sheets-Sheet 11

Inventor
Jesse Daugherty
Carlson, Pitzner, Hubbard & Wolfe
Attorneys

HIGH-SPEED FLOOR TYPE CONTOUR MILLING MACHINE

Original Filed Nov. 9, 1954 24 Sheets-Sheet 12

Inventor
Jesse Daugherty
Carlson, Pitzner, Hubbard & Wolfe
Attorneys

HIGH-SPEED FLOOR TYPE CONTOUR MILLING MACHINE

Original Filed Nov. 9, 1954 24 Sheets-Sheet 13

Inventor
Jesse Daugherty
Carlson, Pitzner, Hubbard + Wolfe
Attorneys

HIGH-SPEED FLOOR TYPE CONTOUR MILLING MACHINE

Original Filed Nov. 9, 1954 24 Sheets-Sheet 14

HIGH-SPEED FLOOR TYPE CONTOUR MILLING MACHINE

Original Filed Nov. 9, 1954 24 Sheets-Sheet 15

Inventor
Jesse Daugherty
Carlson, Pitzner, Hubbard & Wolfe
Attorneys

HIGH-SPEED FLOOR TYPE CONTOUR MILLING MACHINE

Original Filed Nov. 9, 1954 24 Sheets-Sheet 1

Inventor
Jesse Daugherty
Carlson, Pitzner, Hubbard & Wolfe
Attorneys

HIGH-SPEED FLOOR TYPE CONTOUR MILLING MACHINE

Original Filed Nov. 9, 1954 24 Sheets-Sheet 17

Inventor
Jesse Daugherty
Carlson, Pitzner, Hubbard + Wolfe
Attorneys

HIGH-SPEED FLOOR TYPE CONTOUR MILLING MACHINE

Original Filed Nov. 9, 1954 24 Sheets-Sheet 18

Inventor
Jesse Daugherty
Carlson, Pitzner, Hubbard & Wolfe
Attorneys

HIGH-SPEED FLOOR TYPE CONTOUR MILLING MACHINE

Original Filed Nov. 9, 1954 24 Sheets-Sheet 19

Inventor
Jesse Daugherty
Carlson, Pitzner, Hubbard & Wolfe
Attorneys

HIGH-SPEED FLOOR TYPE CONTOUR MILLING MACHINE

Original Filed Nov. 9, 1954 24 Sheets-Sheet 20

Inventor
Jesse Daugherty
Carlson, Pitzner, Hubbard & Wolfe
Attorneys

HIGH-SPEED FLOOR TYPE CONTOUR MILLING MACHINE

Original Filed Nov. 9, 1954 24 Sheets-Sheet 21

Inventor
Jesse Daugherty
Carlson, Pitzner, Hubbard & Wolfe
Attorneys

HIGH-SPEED FLOOR TYPE CONTOUR MILLING MACHINE

Original Filed Nov. 9, 1954 24 Sheets-Sheet 22

Inventor
Jesse Daugherty
Carlson, Pitzner, Hubbard & Wolfe
Attorneys

HIGH-SPEED FLOOR TYPE CONTOUR MILLING MACHINE

Original Filed Nov. 9, 1954 24 Sheets-Sheet 23

Inventor
Jesse Daugherty
Carlson, Pitzner, Hubbard + Wolfe
Attorneys

HIGH-SPEED FLOOR TYPE CONTOUR MILLING MACHINE

Original Filed Nov. 9, 1954 24 Sheets-Sheet 24

Inventor
Jesse Daugherty
Carlson, Pitzner, Hubbard & Wolfe
Attorneys

United States Patent Office

Re. 26,393
Reissued May 21, 1968

26,393
HIGH-SPEED FLOOR TYPE CONTOUR MILLING MACHINE

Jesse Daugherty, Hollywood, Fla., assignor to Giddings & Lewis Machine Tool Company, Fond du Lac, Wis., a corporation of Wisconsin Original No. 2,863,361, dated Dec. 9, 1958, Ser. No. 467,771, Nov. 9, 1954. Application for reissue Oct. 16, 1967, Ser. No. 676,661
9 Claims. (Cl. 90—13)

Matter enclosed in heavy brackets [ ] appears in the original patent but forms no part of this reissue specification; matter printed in italics indicates the additions made by reissue.

*ABSTRACT OF THE DISCLOSURE*

*A floor type contour milling machine having a relatively long fixed base, a sliding base mounted on the fixed base, a generally sector shaped swivel base movable in an arcuate path on the sliding base, an upstanding column of generally triangular cross section fixed to the swivel base and movable therewith, a vertically reciprocable saddle carried by the column and having a vertical swivel saddle mounted thereon carrying a headstock adapted to receive a cutter and power drives for moving the saddles and the bases relative to each other. A source of signals is provided which automatically controls the power drives for effecting a total of five motions of the cutter relative to a workpiece in simultaneous combinations.*

The present invention relates to the field of machine tools, and, more specifically, to milling machines. The invention finds particular, but not exclusive, utility in a large, high-speed, floor type contour milling machine which is especially well adapted for automatic control.

One object of the invention is to provide a high-speed, high-power, floor type milling machine which is useful in pilot or tracer controlled machining of aircraft parts and various other workpieces.

Another object is to provide a machine of the character set forth and capable of effecting a total of five different pilot or tracer controlled motions of the cutter relative to the work. A related object is to provide a machine in which any four of the five motions are available in a simultaneous combination.

A further object is to provide a machine of the foregoing type which is particularly well suited for the precision machining of forgings and extrusions of light, nonferrous metal on a mass productive basis.

Still another object is to provide a machine of the character set forth and having a novel counterbalancing arrangement for certain major elements which are movable in a vertical plane.

The objects of the invention thus generally stated, together with other objects and advantages, will become more apparent as the following description proceeds, taken together with the accompanying drawings, in which:

FIG. 4 is an enlarged fragmentary plan view showing a section of the fixed bed of the machine.

FIG. 13 is a horizontal sectional view through one portion of the vertical saddle and its associated column structure.

FIG. 14 is a fragmentary vertical sectional view taken through the vertical saddle drive nut and in the plane of line 14—14 in FIG. 13.

Figure 1:
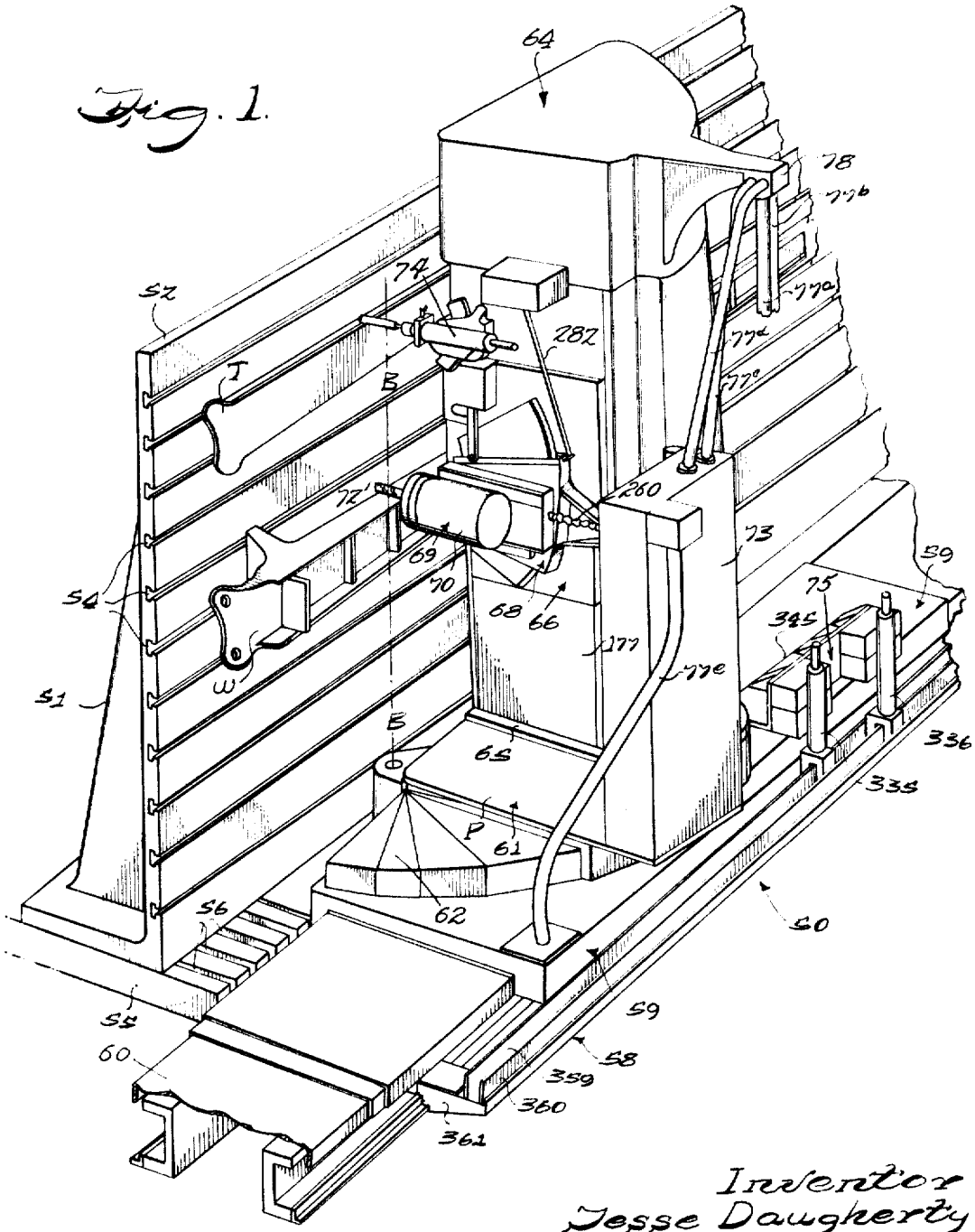
FIGURE 1 is a perspective view of a high-speed, floor type milling machine exemplifying the present invention, such view including a workpiece and template support alongside of the machine.

While the invention is susceptible of various modifications and alternative constructions, a certain machine constituting an illustrative embodiment has been shown in the drawings and will be described below in considerable detail. It should be understood, however, that there is no intention to limit the invention to the specific form of the machine disclosed herein, but, on the contrary, the intention is to cover all modifications, alternative constructions and equivalents falling within the spirit and scope of the invention as expressed in the appended claims.

GENERAL MACHINE ORGANIZATION

Figure 3:
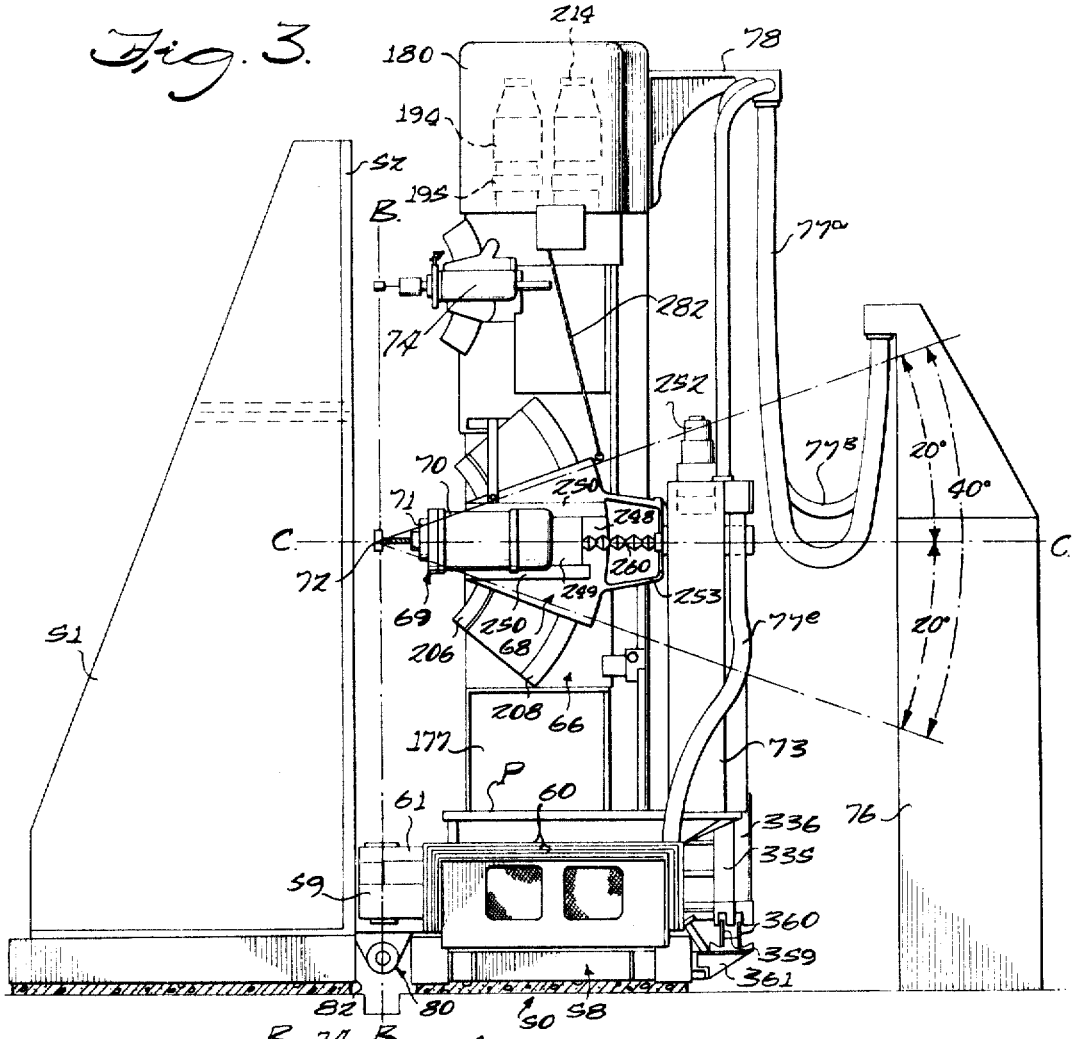
FIG. 3 is an end elevation of the machine shown in FIGS. 1 and 2.
Figure 1A:
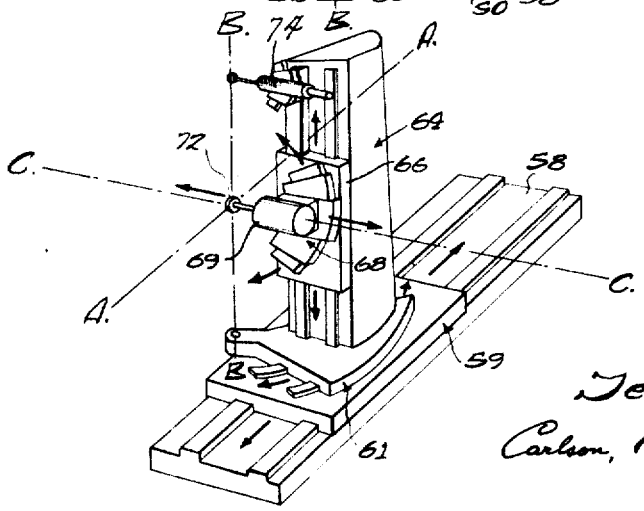
FIG. 1A is a diagrammatic view showing the major elements of such machine and their relation to the cutter.
Figure 2:
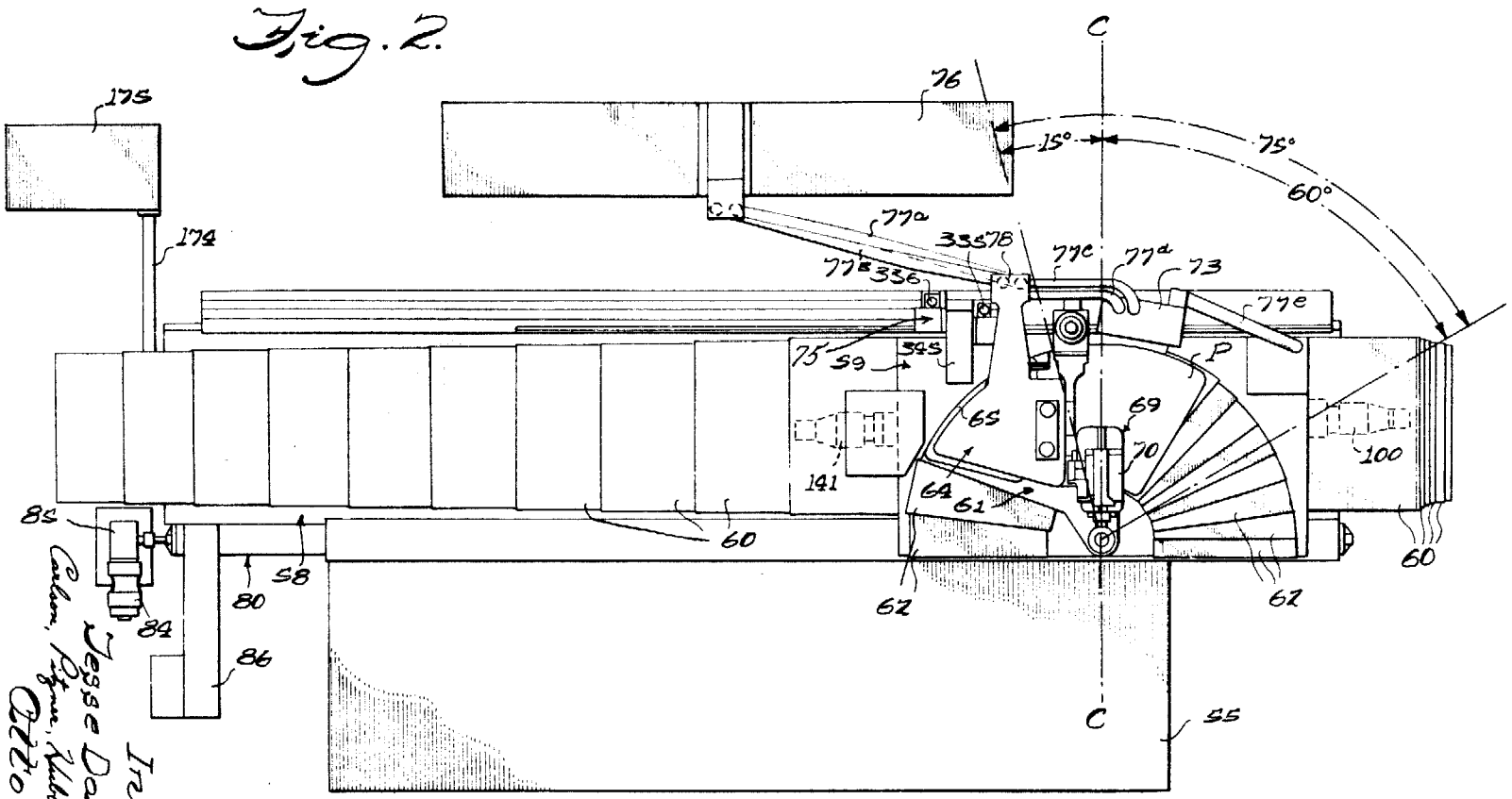
FIG. 2 is a plan view of the illustrative machine illustrated in FIG. 1.

Referring more specifically to FIGS. 1, 2 and 3, the invention is there exemplified in a high-speed floor type contour milling machine 50 which in this instance is set up to machine a workpiece W. The latter happens to be a forging of light non-ferrous metal ultimately destined to be an aircraft structural component. A relatively heavy work fixture 51 supports the workpiece W during machining, and for this purpose has an upstanding wall 52 which includes a series of substantially parallel T-slots 54 in its front face. The fixture 51 rests upon, and is fixed to, a bed 55 mounted in the floor alongside the machine 50 and which may be provided with transverse T-slots 56. Although closely associated with the machine 50, the work supporting fixture 51 and its bed 55 are not actually parts of the machine.

Turning now to the machine 50, the same comprises a relatively long fixed base 58 which may be secured to an underlying foundation in any suitable manner. The fixed base 58 carries on its top side a sliding base 59 which is adapted to be moved longitudinally of the fixed base by reason of a runway defined on the latter. In order to keep out chips and other foreign material, this runway is covered by telescoping guards 60 located on either end of the sliding base and which automatically extend or collapse as an incident to movement of the sliding base. The sliding base 59, in turn, supports a swivel base 61. By reason of certain supporting and guiding elements interposed between the sliding base 59 and the swivel base 61, the latter is adapted to be shifted in an arcuate path along the top of the sliding base. These supporting and guiding elements are also protected against the entry of chips and foreign materials by telescoping guards 62 situated on both sides of the swivel base 61.

Rigidly fixed to the top of swivel base 61 and projecting upwardly therefrom is a column 64. The bottom of the column 64 is surrounded by an integral flange 65 which is bolted solidly to the swivel base. The column 64 serves as a support for a vertical saddle 66 which is mounted for vertical sliding movement on one side of the column. The vertical saddle 66 carries a vertical swivel saddle 68 which is movable bodily therewith. Supporting and guiding elements interposed between the vertical saddle 66 and the vertical swivel saddle 68 permit arcuate movement of the latter in a vertical plane. The vertical swivel saddle, in turn, supports a headstock 69 comprising an electric motor 70 and a spindle 71 coupled directly to the motor. The motor 70 in this case is water cooled and may have a rating on the order of 20 to 50 horsepower. The spindle 71 drivingly supports a milling cutter 72 which may be of any form appropriate to the work being machined.

The motions of the major elements of the machine 50 are subject to pilot or tracer control, either singly or in various combinations. This is accomplished by the use of a profiling tracer assembly 74 fixed to the vertical saddle 66 in substantially overlying relation with the headstock. Tracer control of the swiveling motions of the machine is effected by means of swivel tracer assembly 75 carried by the sliding base 59.

Power is supplied to the machine 50 from a main power and control panel 76 situated alongside of the machine and housed within a metal cubicle. The panel 76, which also includes a number of electrical controls, is connected to the machine 50 via flexible main conduits 77a, 77b. The latter extend from the panel cubicle to a bracket 78 fixed to the top of the column and have sufficient slack to accommodate the full travel of the sliding base and the column. The conduits 77a, 77b connect with rigid conduits 77c, 77d leading from the bracket 78 to a control box 73, the latter being rigidly mounted on the swivel base 61 adjacent the operator's platform P. A slack flexible conduit 77e extends from the box 73 to the sliding base 59.

An ancillary but highly important attachment operatively associated with the machine 50 is a chip conveyor 80. As indicated in FIGS. 2, 3 and 4, the latter is mounted adjacent the fixed base 58 and is comparable in length with it. In this case, the chip conveyor comprises a screw or auger element 81 which rotates in an underlying trough 82. The auger 81, driven by means of motor 84 and gear unit 85, is adapted to move chips from the region of the cutter back toward the motor and gear unit 84, 85, discharging the chips in a disposal chute 86.

THE BASE ASSEMBLY

In general, the base assembly comprises three major elements, namely, the fixed base 58, the sliding base 59, and the swivel base 61 (FIGS. 4–7, inclusive). The fixed and sliding bases 58, 59, in this instance happen to be fabricated by welding together steel plates and other structural elements, while the swivel base 61 may be formed as an internally ribbed casting.

As shown in FIGS. 2, 4, 6, 7 and 8, the fixed base 58 is a relatively long box-like member which, for convenience in manufacture and assembly, may be made in longitudinal sections secured together as by means of bolts 90 (FIG. 4). The base 58 may be secured to an appropriate foundation by means of a plurality of anchor feet 91 rigidly fixed to its sides and each provided with a hold-down bolt 92. Projecting slightly above the top of the fixed base 58 and disposed thereon in laterally spaced relation are a pair of ways 94. In this case, the ways 94 are of flat configuration and extend the length of the base 58, defining a runway for the sliding base 59 and supporting the same.

Rigidly fixed to the top of the base 58 and nested between the ways 94 is a rack 95 which extends longitudinally of the base and parallel to the ways 94. The rack 95 may be formed in sections and secured in place by means of a mounting bracket 96. The rack 95 cooperates with drive gearing carried by the sliding base 59 to effect movement of the latter longitudinally of the ways 94.

Figure 7:
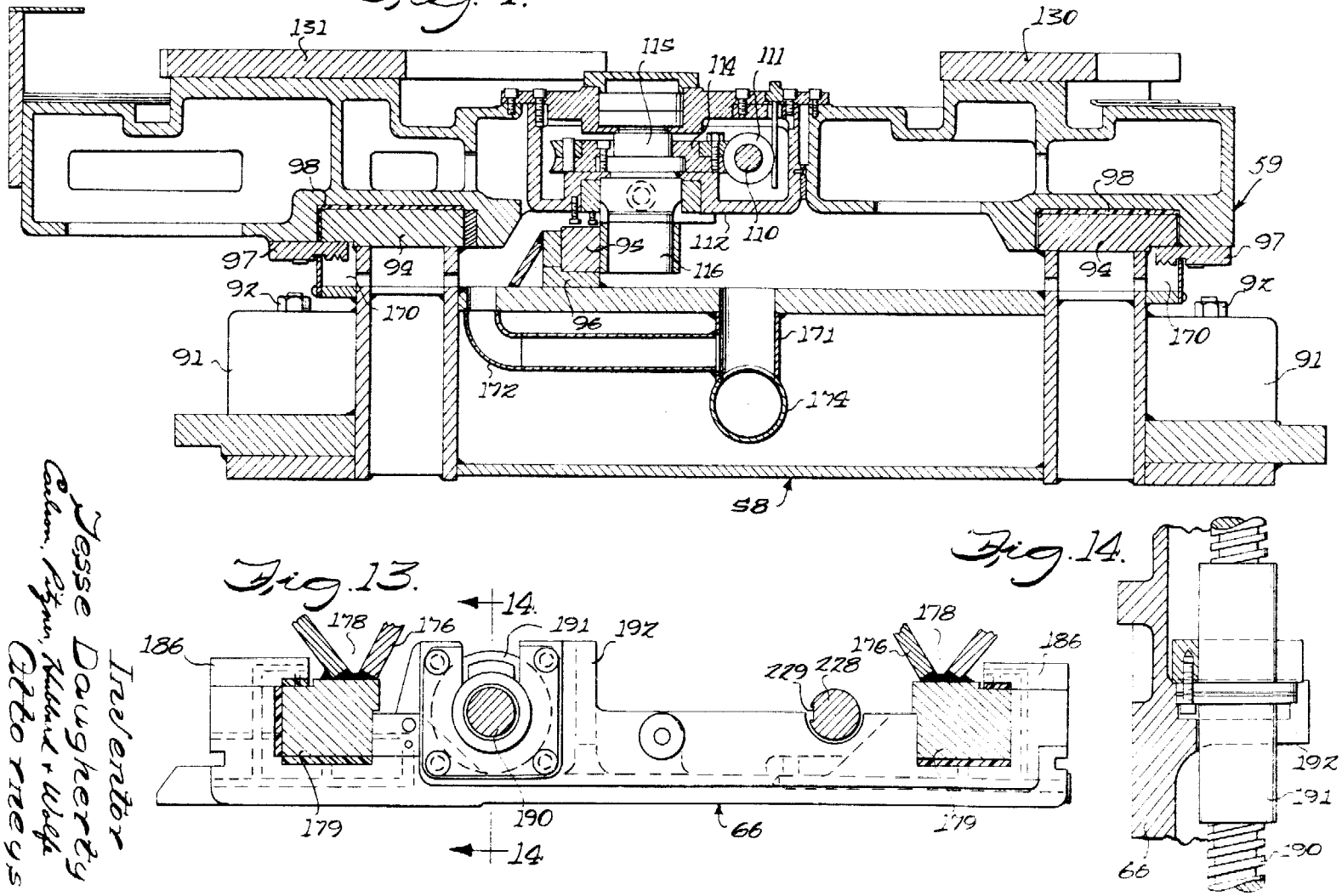
FIG. 7 is an enlarged transverse sectional view through the fixed base and the sliding base of the machine, taken in the plane of the line 7—7 in FIG. 5.

The sliding base 59 (FIGS. 1, 2 and 5), is of generally rectangular form and is slidably mounted on the ways 94, being retained in place as by means of cleats 97 (FIG. 7). Those portions of the sliding base 59 which are opposite the supporting and guiding surfaces of the ways 94 may be equipped with non-metallic wear plates 98. The latter may be fashioned with suitable oil passages and recesses to define hydrostatic pressure pads and thereby greatly minimize friction along the ways 94.

Figure 5:
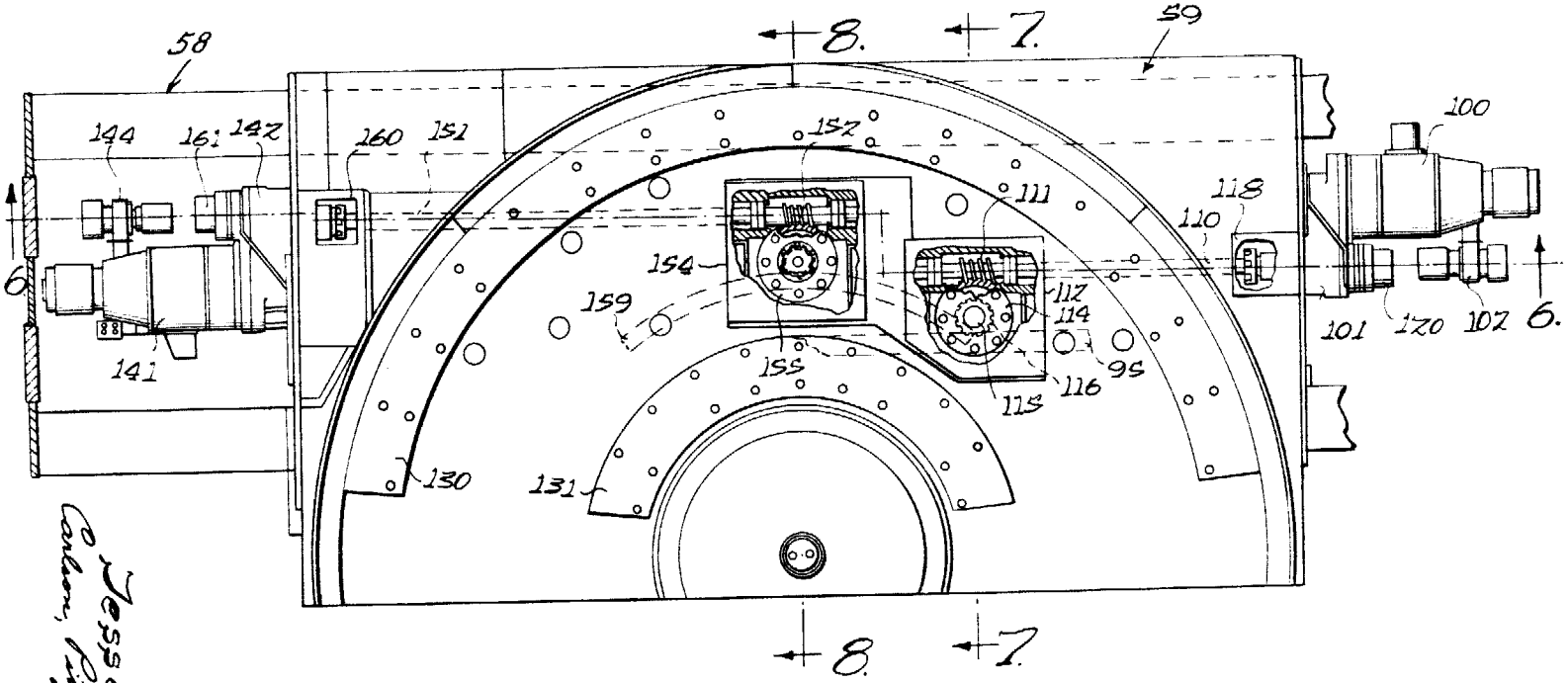
FIG. 5 is a plan view of the sliding base of the machine, including certain driving mechanism.
Figure 6:
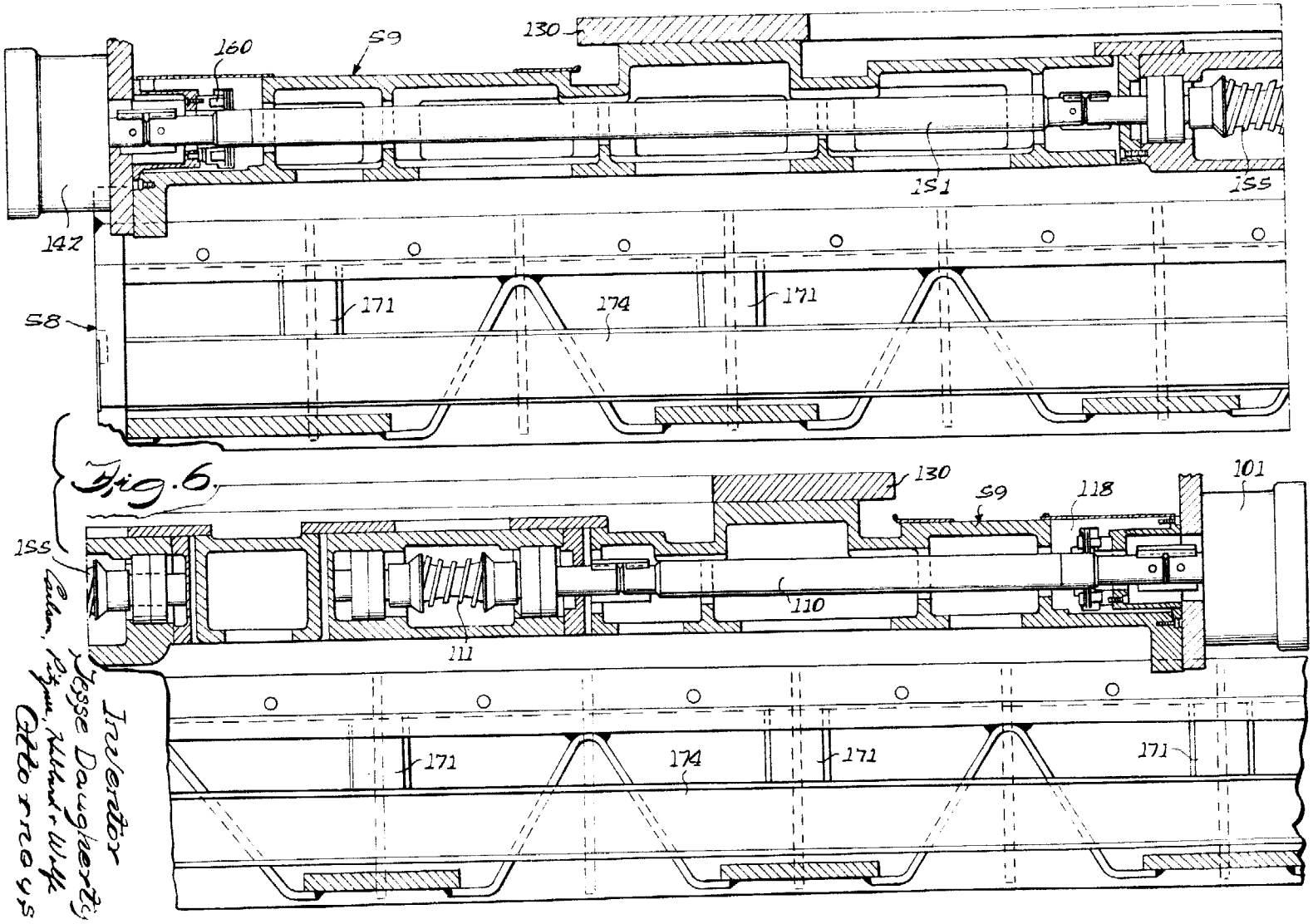
FIG. 6 is an enlarged fragmentary longitudinal sectional view taken through the fixed base and the sliding base of the machine and in the plane of the line 6—6 in FIG. 5.
Figure 25:
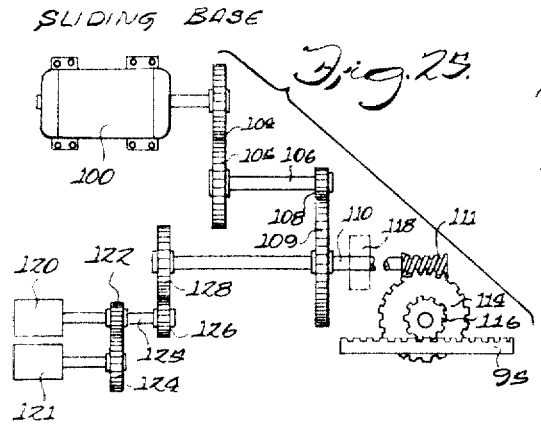
FIGS. 25, 26, 27, 28 and 29 are diagrammatic views illustrating the motor drives for controlling the motions of the sliding base, swivel base, vertical saddle, vertical swivel saddle, and headstock depth slide, respectively.

The drive for traversing the sliding base 59 along the ways 94 of the fixed base 58 is shown in some detail in FIGS. 5, 7 and 25. The drive comprises an electric motor 100 and gear box 101 rigidly fixed to the right-hand end of the sliding base 59 (as viewed in FIG. 5). The motor 100 may be cooled by means of a small motor driven blower 102 carried by its casing. The gear box 101 houses a transmission (FIG. 25) comprising gears 104, 105, countershaft 106, reduction pinion 108 and output gear 109. The gear 109 has a direct connection with drive shaft 110 which extends longitudinally of the sliding base 59. The end of the shaft remote from the gear 109 terminates in a worm 111 journaled within a gear box 112. The worm 111 meshes with and drives a worm wheel 114 which is fixed to a short vertically disposed stub shaft 115 journalled in the gear box 112. The lower end of the stub shaft 115 terminates in a relatively heavy drive pinion 116 which meshes with the teeth of the rack 95. With the arrangement just described, it will be appreciated that rotation of the motor 100 will effect rotation of the drive pinion 116 and, since the rack 95 is rigidly attached to the fixed base 58, the result will be motion of the sliding base 59 along the ways 94 of the fixed base.

To guard against accidental movement of the sliding base 59 when the motor 100 is not energized, the sliding base 59 has mounted thereon an electromagnetic brake unit 118 (FIGS. 5 and 25). The unit 118 has elements adapted to engage the drive shaft 110 and, in effect, serves as a clamp which prevents rotation of the shaft 110 as well as the related elements of the drive.

In order to adapt the sliding base drive for automatic operation, including tracer control or magnetic tape control, one or more selsyn units may be coupled to the drive (FIGS. 5 and 25). In this instance, a low-speed selsyn 120 and a high-speed selsyn 121 are mechanically connected by gears 122, 124 and connected to the drive shaft 110 via an intermediate shaft 125 and gears 126, 128, the latter being coupled directly to the shaft 110.

Figure 17:
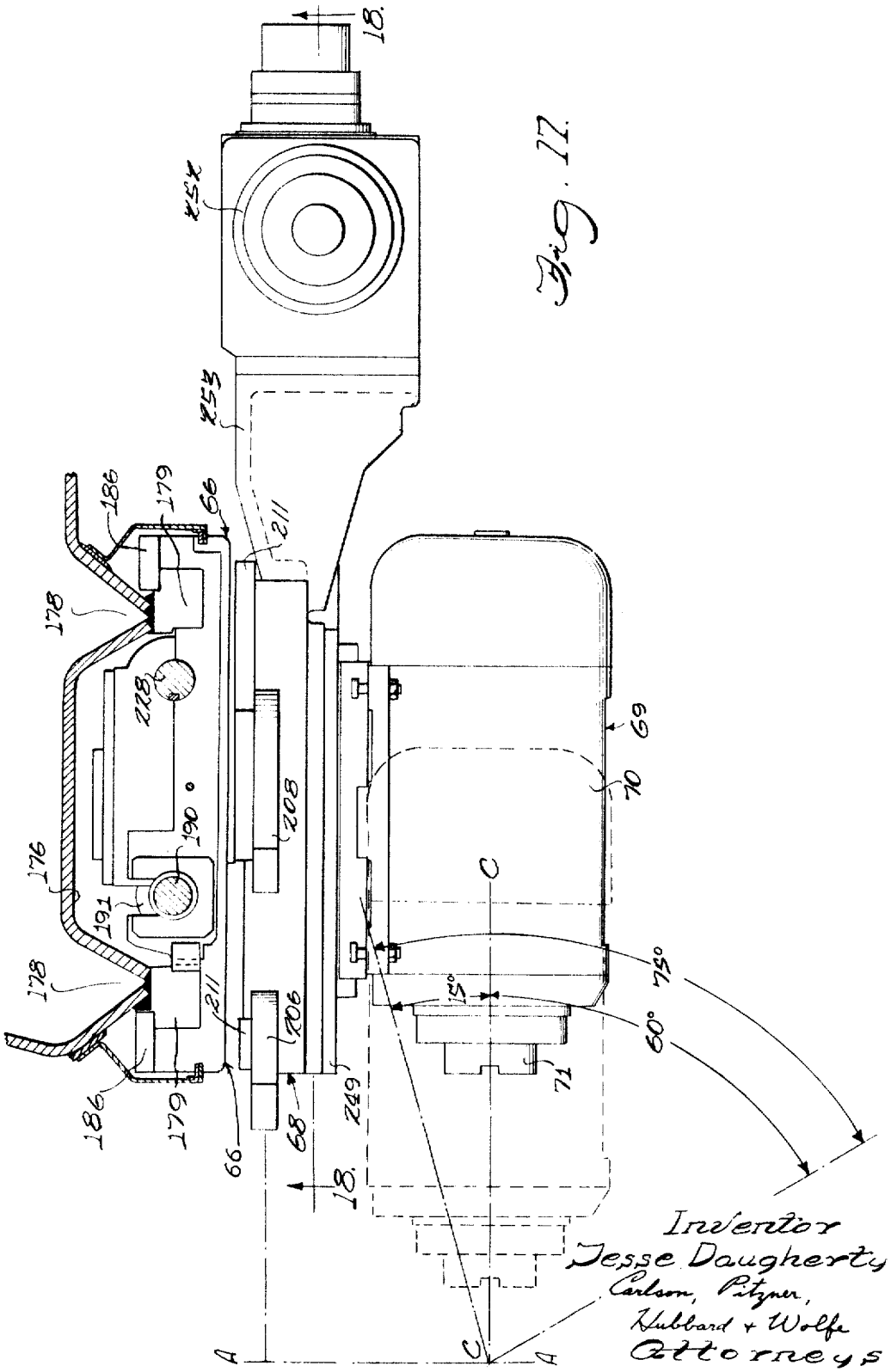
FIG. 17 is a horizontal sectional view through the upper portion of the column and showing the vertical saddle and headstock in plan.

As indicated earlier herein, the swivel base, or column swivel base, 61 is somewhat sector-shaped and is mounted on top of the sliding base 59, being disposed for arcuate movement about a vertical axis (FIGS. 1, 1A, 2 and 17). This axis, designated "B—B," is situated adjacent one side of the machine and passes through the center of the cutter 72 mounted in the headstock. As shown in FIGS. 2 and 17, the total arcuate swing of the swivel base 61 (which is also the total arcuate swing of the machine elements mounted thereon) in this case happens to be 75°. The parts are so constructed that the swivel base can swing clockwise from a neutral position shown in FIG. 4 for a distance of 60°, and counterclockwise from such neutral position for a distance of 15°.

Figure 8:
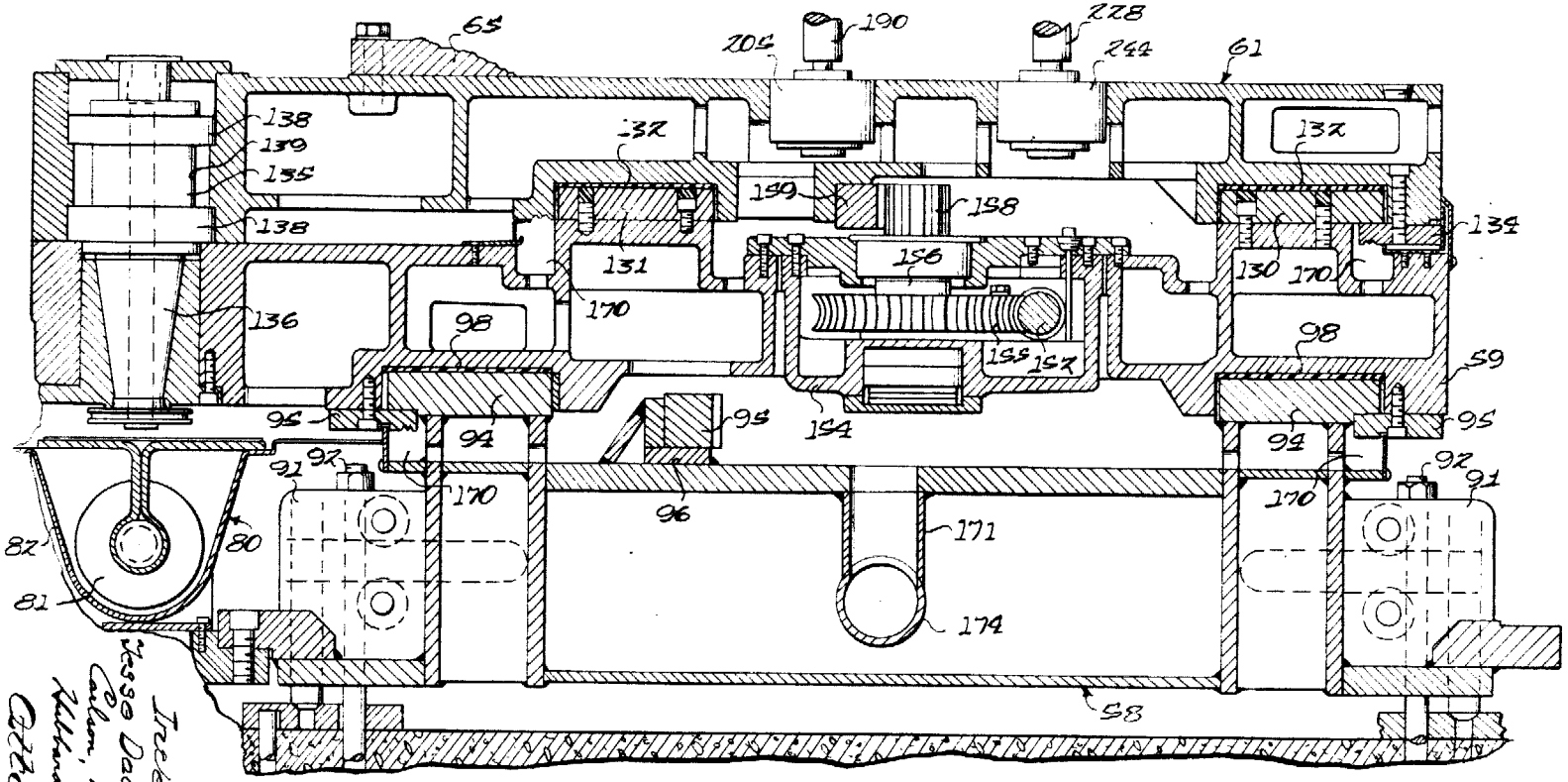
FIG. 8 is an enlarged transverse sectional view taken through the fixed, sliding and swivel bases of the machine in the plane of the line 8—8 in FIG. 5.

To support and guide the swivel base 61 during its arcuate movement, the sliding base 59 has fixed on its top side a pair of arcuate or segmental ways 130, 131 (FIGS. 5, 7 and 8). These arcuate ways, in the present instance have flat top surfaces and are disposed in concentric relation with the vertical axis B—B. On its underside, the swivel base 61 is formed with arcuate recesses for registering with the arcuate ways 130, 131 and such recesses are lined with non-metallic wear plates 132 similar to the wear plates 98 described earlier herein. Like the plates 98, the wear plates 132 may also be formed with recesses defining hydrostatic pressure pads or pockets for minimizing friction. The swivel base is held against the way 130 by means of cleats 134 similar to the cleats 95. Cooperating with the arcuate ways 130, 131 in guiding the swivel base 61 on the sliding base is an upstanding pivot shaft 135 (FIG. 8). The latter is tightly secured within a tapered seat in the sliding base 59 by means of a tapered shank 136. An extension 137 of the swivel base fits over the pivot shaft 135 and anti-friction bearings 138, housed within a bearing cavity 139 in such extension, permit the swivel base 61 to be swung about the axis B—B with little friction and substantial accuracy. The pivot shaft may be fashioned with one or more longitudinal bores 140 (not detailed) for supplying lubrication and other services to the swivel base and the elements mounted thereon.

Figure 26:
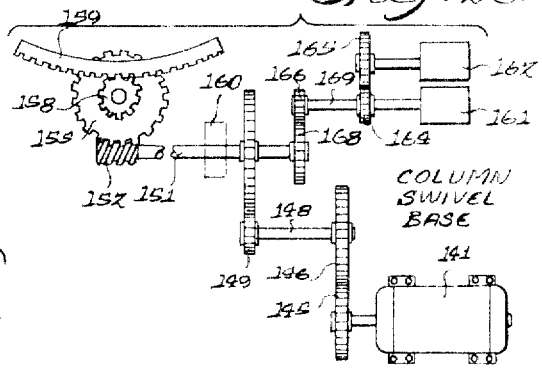

The drive for traversing the swivel base 61 along the arcuate ways 130, 131 of the sliding base 59 is shown most clearly in FIGS. 5, 6, 8 and 26. Such drive comprises an electric motor 141 and gear box 142 rigidly fixed to the left-hand end of the sliding base 59 (as viewed in FIG. 5). Like the motor 100 at the opposite end of the sliding base, the motor 141 is cooled by the small blower 144. The gear box 142 contains a transmission including gears 145, 146, countershaft 148, reduction pinion 149 and output gear 150 (FIG. 26). The latter is directly coupled with a drive shaft 151 which extends longitudinally of the sliding base 59. The end of the shaft 151 remote from the gear box 142 connects with a worm 152 housed within a gear box 154 (FIGS. 5 and 8). The worm 152 meshes with and drives a worm wheel 155, the latter being fixed on a vertically disposed stub shaft 156 journaled in the gear box 154. The upper end of the stub shaft 156 terminates in a relatively heavy drive pinion 158 which meshes with the teeth of an arcuate gear segment 159 rigidly fixed to the underside of the swivel base 61. By reason of the foregoing driving connections, it will be appreciated that rotation of the motor 141 will effect rotation of the pinion 158, transmitting a driving torque to the gear segment 159 and thus swinging the swivel base 61 about the pivot shaft 135 and the axis B—B and along the ways 130, 131.

As in the case of the drive for the sliding base, the drive for the swivel base is provided with an electromagnetic brake unit which serves as a clamp when the motor is idle. By the same token, the swivel base drive is provided with low-speed and high-speed selsyn units 161, 162 coupled thereto by means of gears 164, 165, 166, 168, and coupling shaft 169 (FIG. 26).

Oil for lubrication of the ways 130, 131 which carry the swivel base 61, and for lubrication of the ways 94 which carry the sliding base 59, is drawn from the pressure side of the main hydraulic system (not shown in detail) of the machine 50. The oil is delivered from a central pump unit (not shown) and supplied under pressure to hydrostatic lubrication pads or pockets formed in the bearing elements which ride on the ways. Oil which is discharged from the hydrostatic pockets along the ways 130, 131 and 94 will be collected in outboard troughs 170 and thence drained down via suitable apertures into the space between the ways 94 (FIGS. 4, 7 and 8). A plurality of drain conduits 171, 172 deliver the collected oil from this region into a main drain line 174 the latter leading to sump 175 of the machine hydraulic system.

THE COLUMN

The column 64 (FIGS. 1, 2, 3, 9 and 10), which serves as a support for the headstock 69, vertical saddle 66, and vertical swivel saddle 68, rises vertically from the top surface of the swivel base 61, being secured thereto by means of a bottom flange 65 as described earlier herein. The column is disposed with its front face 176 situated approximately centrally of the swivel base 61. The front face 176 is straddled by a pair of laterally spaced protrusions 178 defining therebetween a central vertical recess. Welded or otherwise rigidly fixed to the protrusions 178 are a pair of vertical ways 179 which guide the vertical saddle 66 as it moves up and down the column. The column is surmounted by a cover 180 which houses various associated mechanisms, and its ways are protected by a flexible curtain 177 (FIG. 1).

Figure 9:
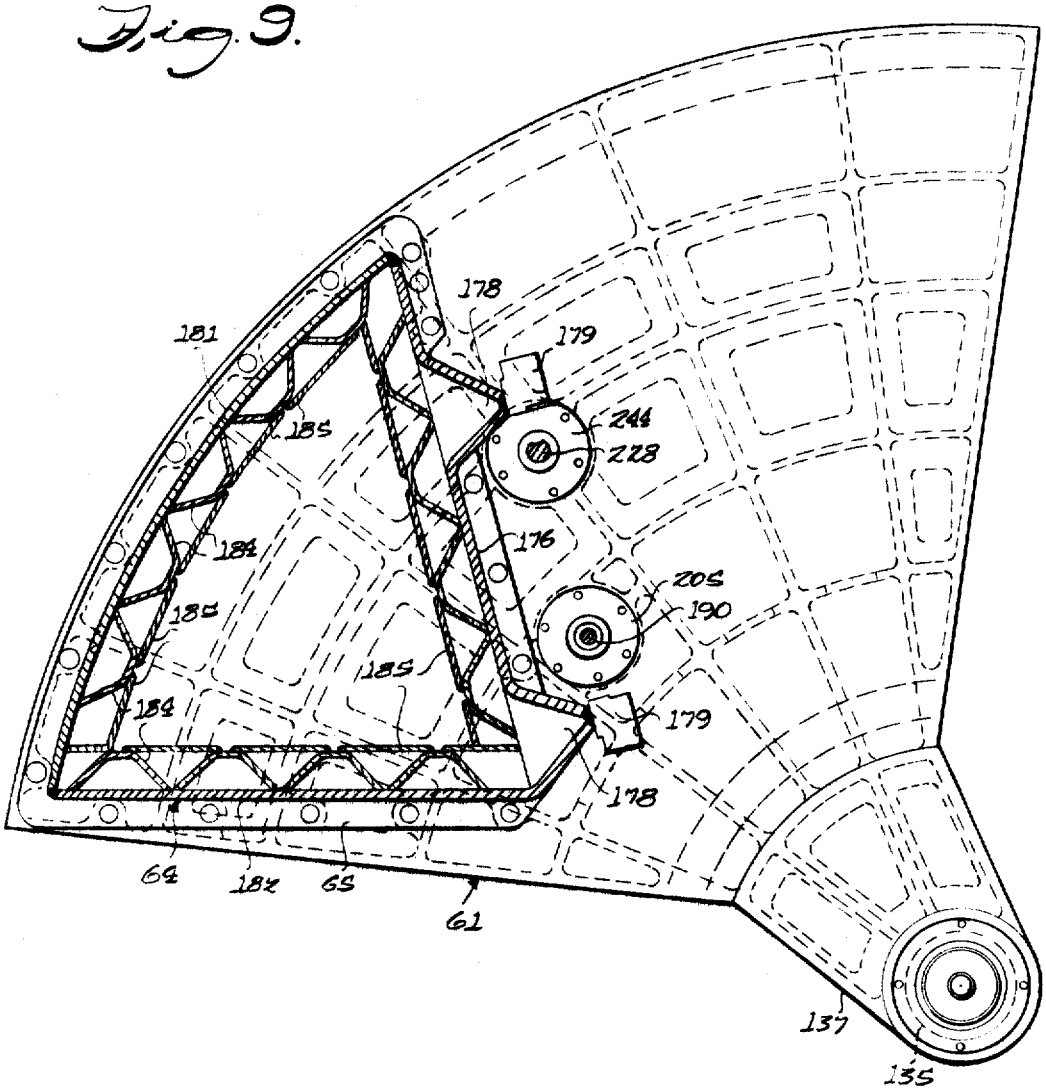
FIG. 9 is a horizontal sectional view taken through the lower portion of the machine column and showing the swivel base in plan.
Figure 10:
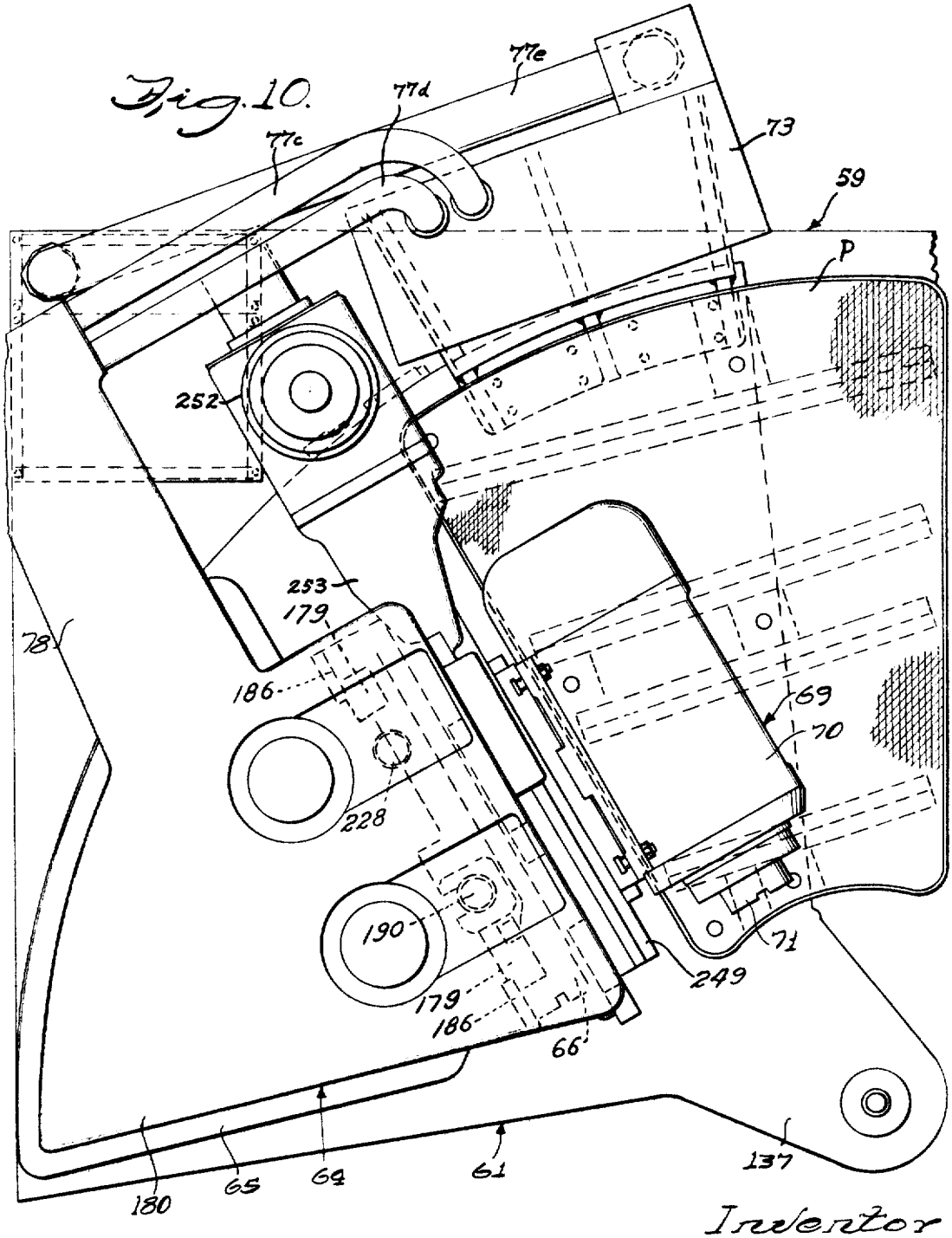
FIG. 10 is a plan view of the machine column, headstock, swivel base, and associated parts.

In order to achieve maximum arcuate travel of the headstock 69 and the swivel base 61, as well as a high degree of longitudinal stiffness, the column 64 is given a substantially triangular cross section (FIGS. 9 and 10). Accordingly, column side faces 181, 182 define an acute angle with each other and acute angles with the front face 176. In the present instances, the face 181 is slightly convex so as to conform to the outer periphery of the swivel base 61 (FIG. 9), making the cross section of the column sector-shaped. Structurally, however, such a cross section may still be considered substantially triangular.

The column 64 may be constructed in various ways and in this case happens to be fabricated by welding component elements together. As shown clearly in FIG. 9, the outer faces 176, 181, 182 are defined by heavy metal plates bent or stamped to the desired shape. These plates are welded together and stiffened internally by means of a series of vertically disposed, outwardly facing channels 184. The channels 184, in turn, are reinforced by a series of vertically disposed plates 185 welded to their backs. The foregoing arrangement produces high strength and rigidity with a minimum of weight.

THE VERTICAL SADDLE

Turning next to the vertical saddle 66 (FIGS. 10 to 17), it will be noted that the same is a generally rectangular, box-like structure nested against the front of the column 64. The vertical saddle is recessed to receive the column ways 179 and held against the latter by cleats 186, being slidable therealong. The recesses of the vertical saddle may have non-metallic wear plates 188 which bear against coacting guide surfaces on the ways 179. The plates 188 may have hydrostatic lubrication pads or pockets (not shown) which are supplied with pressurized oil in the same manner as their counterparts in the base assembly.

Up and down sliding movement of the vertical saddle along the ways 179 is effected by means of a vertically disposed elevating screw 190 (FIGS. 12 to 16) extending from the swivel base 61 to the top portion of the column. The thread on the screw 190 is formed as a helical ball track to minimize wear and friction. The screw 190 transmits movement to the vertical saddle by means of a ball nut 191 rigidly fixed in a bracket 192 near the top of the vertical saddle (FIGS. 12, 13 and 14), the screw passing through the nut 191 and engaging the same.

Figure 27:
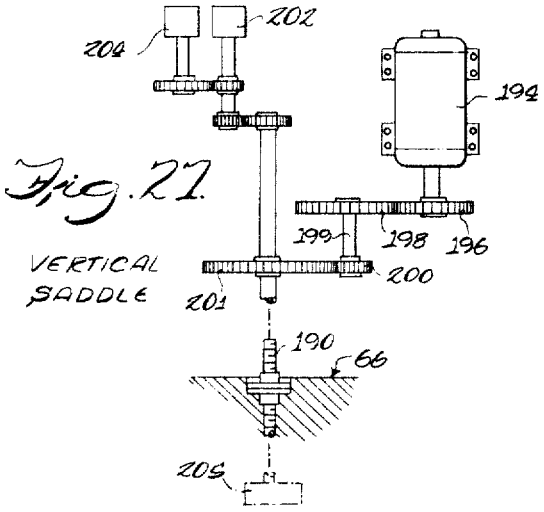

Mechanical power to rotate the screw 190 and thereby impart vertical motion to the vertical saddle 66 is provided by an electric motor 194, similar to the motors 100, 141, but located in the top portion of the column (FIGS. 3, 22, 23 and 27). Housed within a gear box 195 attached to the motor 194 are gears 196, 198, countershaft 199, and gears 200, 201, the latter gear being coupled directly to the top end of the elevating screw 190 (FIG. 27). Low and high speed selsyn units 202, 204, for control purposes, are mechanically connected to the vertical saddle drive in the same manner as the selsyn units associated with the base drives. In addition, a clamp in the form of an electric brake 205 (FIGS. 8, 9 and 16) is mounted in the swivel base 61 and coupled to the lower end of the elevating screw 190 to hold the same against movement when the motor 194 is idle.

THE VERTICAL SWIVEL SADDLE

Figure 11:
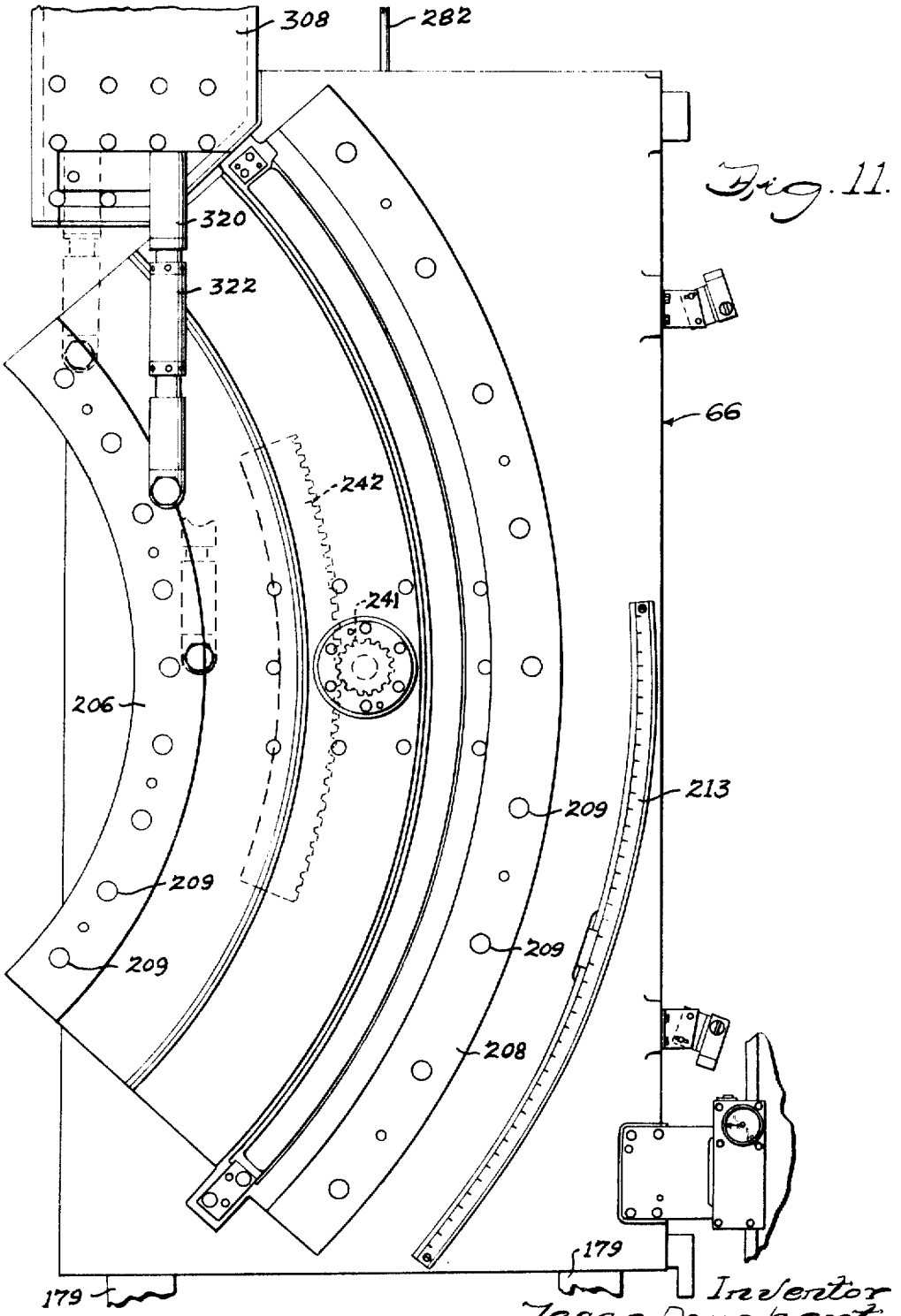
FIGS. 11 and 12 are front and rear elevations, respectively, of the vertical saddle which is mounted on the machine column.
Figure 12:
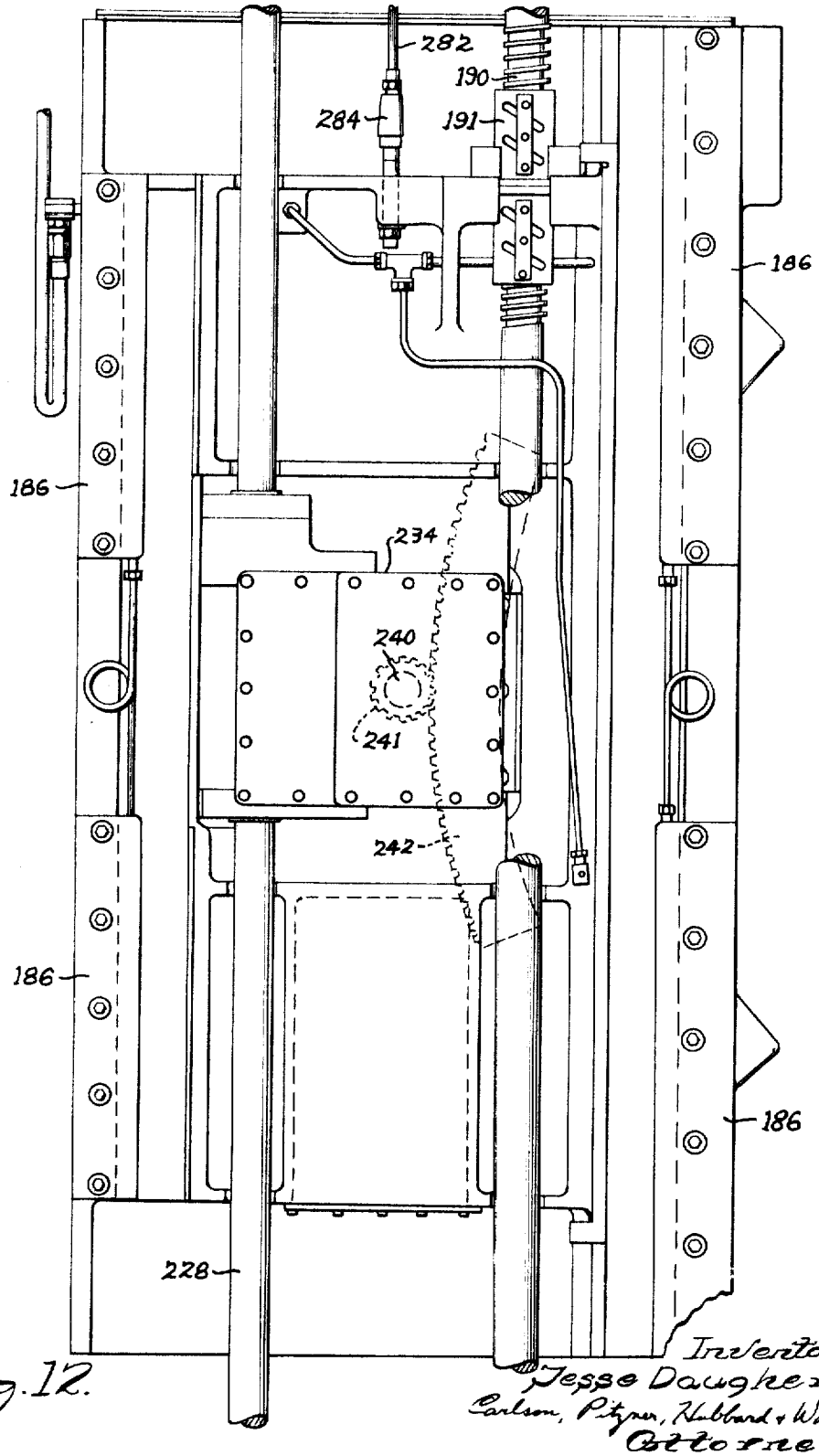
Figure 15:
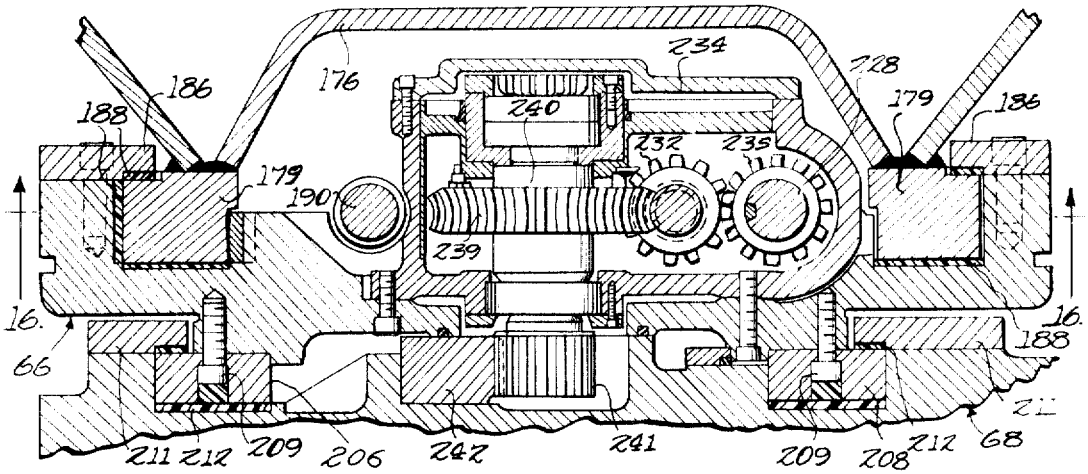
FIG. 15 is a view similar to FIG. 13 but taken through the swiveling drive of the vertical saddle.
Figure 18:
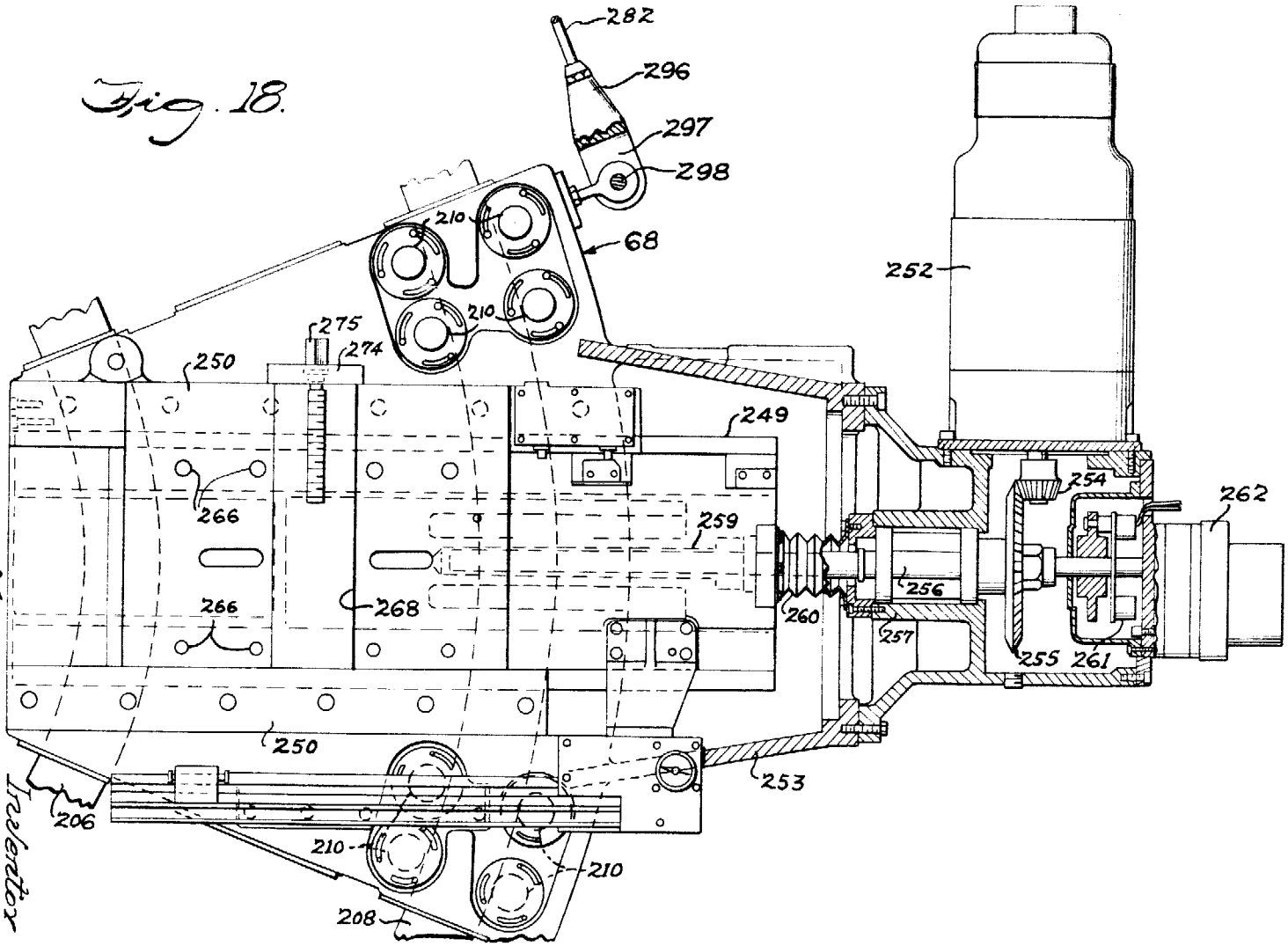
FIG. 18 is a vertical sectional view taken in the plane of the line 18—18 in FIG. 17 and showing the headstock depth control drive and the vertical swivel saddle mounting.

The vertical swivel saddle 68 (FIGS. 3, 17, 18 and 31) which carries the headstock 65, is attached to the front of the vertical saddle 66, as indicated earlier herein. The attachment is such that the swivel saddle 68 is movable bodily with the vertical saddle 66 as the same travels up and down the column 64, and is also movable in an arcuate path relative to the vertical saddle 66. This is accomplished by means of a pair of arcuate ways 206, 208 rigidly secured, as by cap screws 209, to the face of the vertical saddle (FIGS. 3, 11 and 18). With the machine in the condition indicated in FIGS. 1 to 3, the ways 206, 208 have their center of curvature situated in line with the center of the cutter 72 or, in other words, on the horioztal axis A—A. In the present instance, the swivel saddle is guided along the ways 206, 208 primarily by means of two sets of guide bearings 210, four in each set, which are mounted in the swivel saddle and disposed to roll on opposite edges of the larger way 208 (FIG. 18). The swivel saddle is also provided with cleats 211 which bear against the rear faces of the ways 206, 208, and non-metallic wear plates 212 which bear against both the front and rear faces of the ways (FIG. 15). The swivel saddle 68 and the ways 206, 208 are arranged and proportioned that the former will be susceptible of swiveling vertically through an arc of 20° above the horizontal axis C—C and 20° below such axis, a total arcuate travel of 40° (FIG. 3). The extent of such travel may conveniently be read on our angular scale 213 on the vertical saddle.

Figure 16:
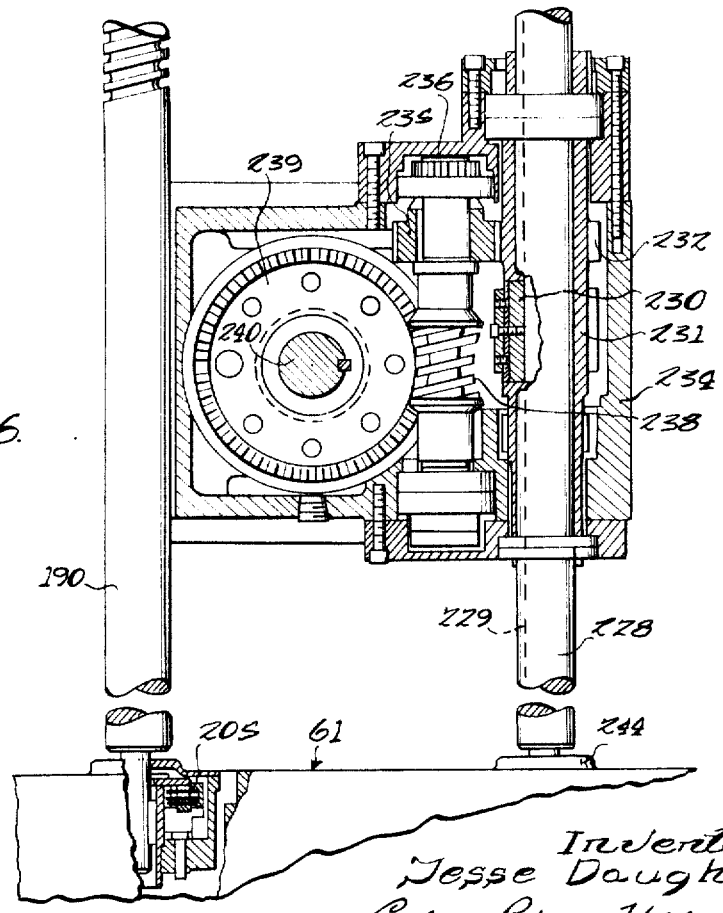
FIG. 16 is a fragmentary vertical sectional view through the drive shown in FIG. 15 and in the plane of the line 16—16.
Figure 28:
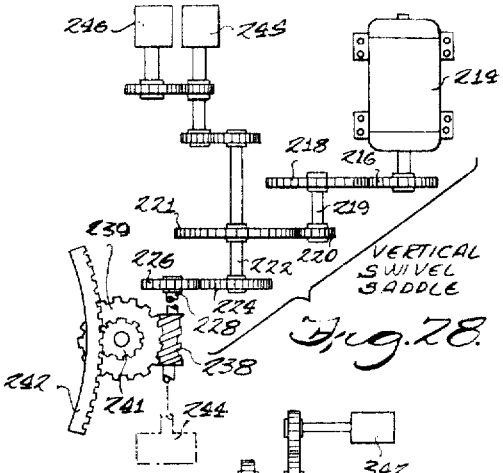

Vertical swiveling movement is imparted to the swivel saddle 68 by means of an electric motor 214 located in the top portion of the column (FIGS. 3, 22, 23 and 24) and an associated drive (FIGS. 15, 16, 23 and 28). The motor 214 is similar to the drive motors 100, 141 and 194 described earlier herein. Housed within a gear box 215 adjacent the motor 214 is a transmission comprising gears 216, 218, countershaft 219, gears 220, 221, countershaft 222 and gears 224, 226 (FIG. 28). The latter is directly coupled to the upper end of a vertically disposed swivel drive shaft 228 extending from the top to the bottom of the column. As shown in FIG. 16, the swivel drive shaft 228 has a keyway 229 extending along the major portion of its length. Slidably keyed to the shaft 228, as by means of key 230, is a sleeve 231 having a pinion 232 integral therewith. The sleeve and pinion 231, 232 are housed within a gear box 234 which is rigidly secured to the rear of the vertical saddle 66 and movable bodily therewith. The pinion 232 meshes with another pinion 235 on a worm shaft 236 journaled with the gear box 234. The worm shaft 236 is integral with a worm 238 which meshes with a worm wheel 239. The latter is secured to a relatively heavy cross shaft 240 journaled in the gear box but terminating externally in a heavy drive pinion 241. This meshes with a gear segment 242 (FIGS. 11, 12, 15 and 28) fixed to the rear face of the vertical swivel saddle 68.

The foregoing drive also includes a clamp in the form of electric brake 244 at the lower end of the swivel drive shaft, and connections to low and high speed selsyn units 245, 246.

THE HEADSTOCK AND ITS ADJUSTMENTS

As indicated earlier herein, the headstock 69 is carried on the vertical swivel saddle 68 and comprises the motor 70 and the spindle 71 which carries a cutter 72 of any appropriate shape (FIGS. 1, 1A, 3, 10, 17 and 18). The motor may be water cooled and have a capacity on the order of 20 to 50 horsepower.

The headstock is mounted on the vertical swivel saddle for sliding movement in either direction on the rotational axis C—C of the motor 70, spindle 71, and cutter 72. Such axis intersects the axes A—A and B—B and is horizontally disposed when the machine is in the condition indicated in FIG. 3. Motion of the headstock along the axis C—C is known as depth adjustment. Such adjustment enables the machine operator to control the position of the cutter trace relative to the depth or horizontal thickness of the workpiece.

Figure 20:
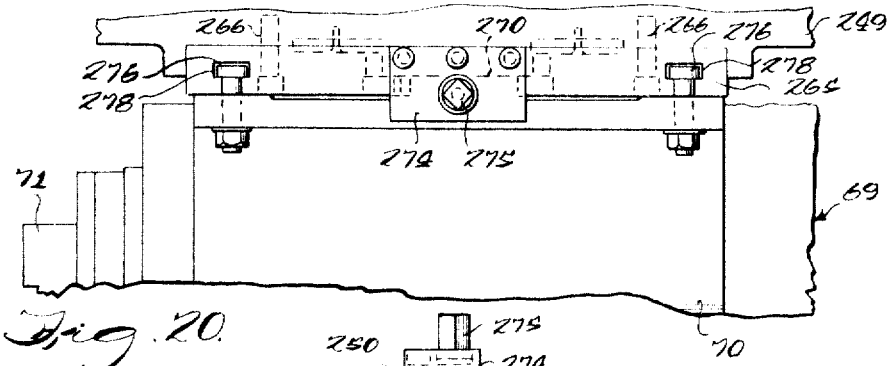
Figure 21:
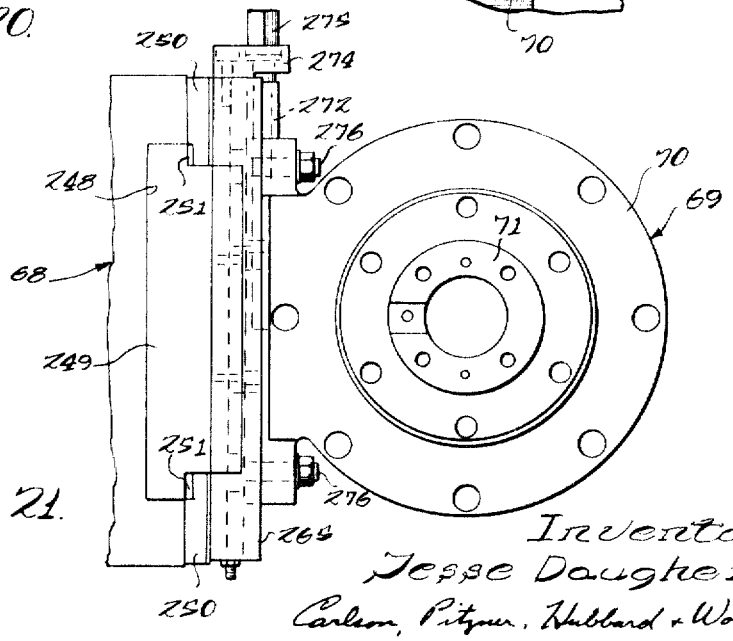
Figure 22:
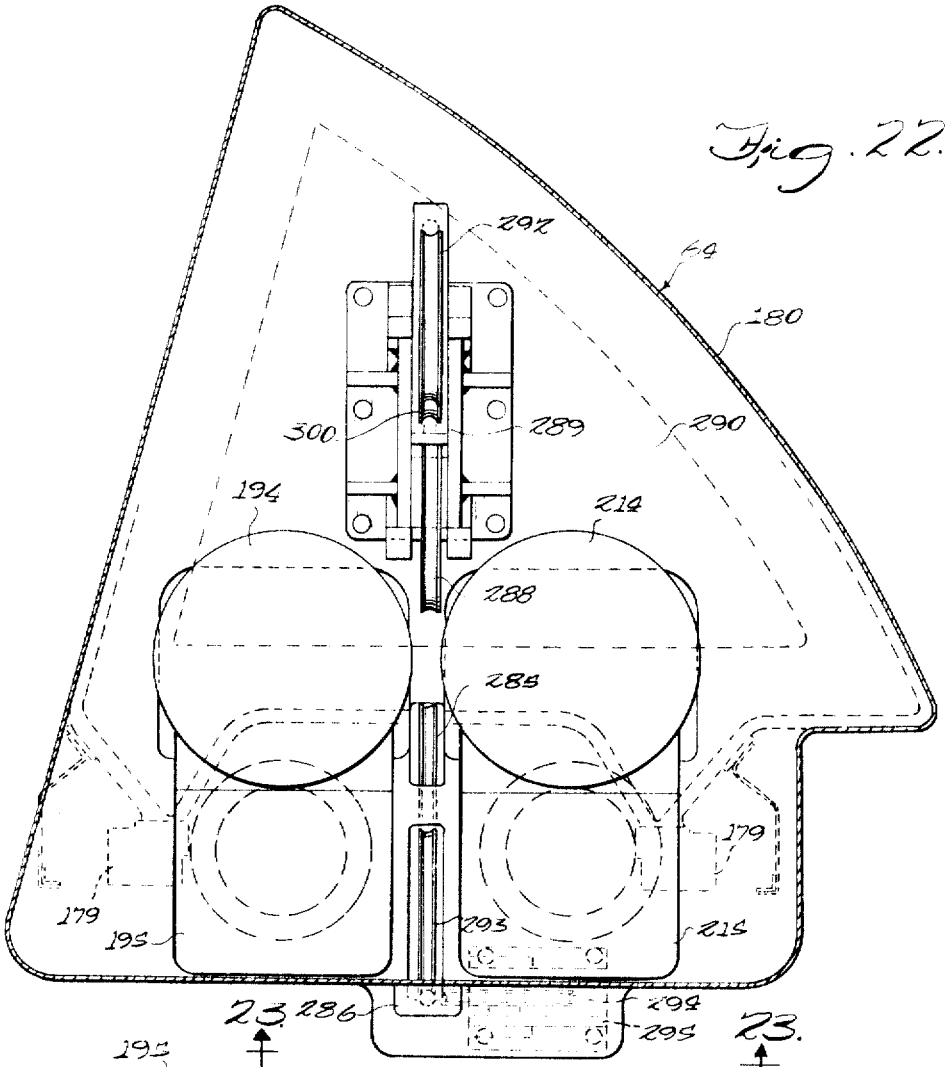
FIGS. 22 and 23 are, respectively, plan and fragmentary elevational views of the upper portion of the machine column with a part of the column housing removed to bring out inside details.
Figure 23:
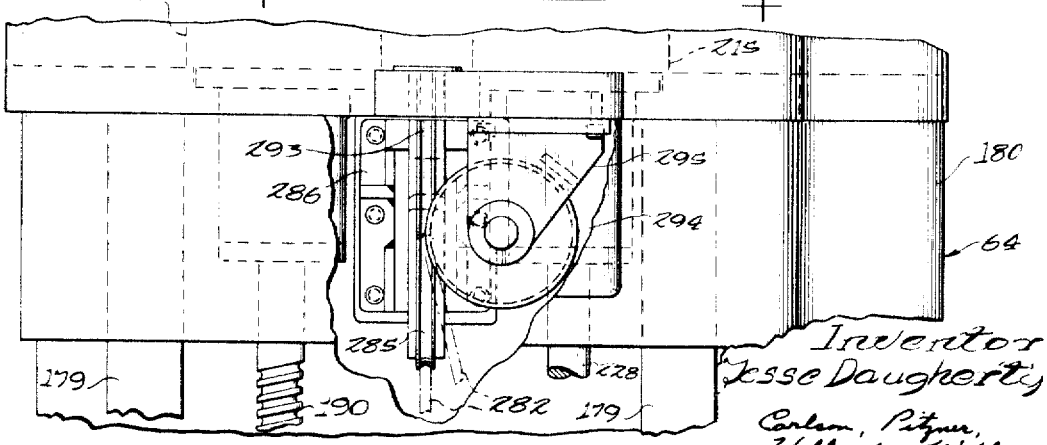

In order to permit depth adjustment of the headstock, the vertical swivel saddle is formed with a wide radial channel 248 in its outer face (FIGS. 3, 20, and 21). The channel 248 receives a rectangular slide 249 which is fixed to the casing of the motor 70. The slide 249 is retained in the channel 248 by means of cleats 250 fastened to the face of the vertical swivel saddle 68 (FIGS. 3, 17 18 and 21). The latter may include non-metallic wear plates 251 (FIG. 21).

Power actuation of the headstock depth adjustment is accomplished by means of an electric motor 252 (FIGS. 3, 10, 17, 18 and 29) mounted on a bracket 253 fixed to the vertical swivel saddle 68. The motor 252 is connected, as by bevel gears 254, 255, to a feed screw 256 journaled in a hub 257 on the bracket 253 and extending longitudinally of the channel 248. The feed screw 256 engages a nut 258 fixed at the mouth of a relatively deep clearance socket 259 in the headstock depth slide 249 and when rotated imparts longitudinal sliding motion to the latter. The exposed intermediate portion of the feed screw between the hub 258 and the depth slide is covered by a protective bellows 260 (FIGS. 1, 3 and 18). With the foregoing arrangement, the motor 252 is adapted to shift the headstock 69 on its depth slide 249 anywhere between the retracted position shown in FIGS. 17 and 18, and the extended position indicated in dot-dash lines in FIG. 17, and such motion may occur in either direction along the axis C—C.

Figure 29:
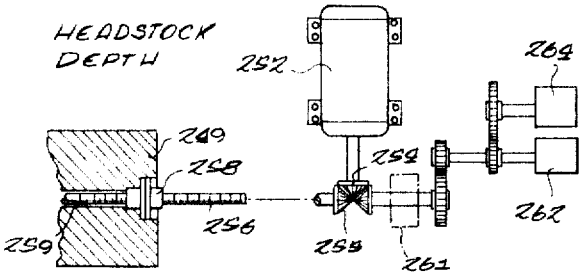

Operatively associated with the headstock depth adjustment drive and mechanically coupled thereto are an electric brake type clamp 261 and low and high speed selsyn units 262, 264 (FIGS. 18 and 29).

Figure 19:
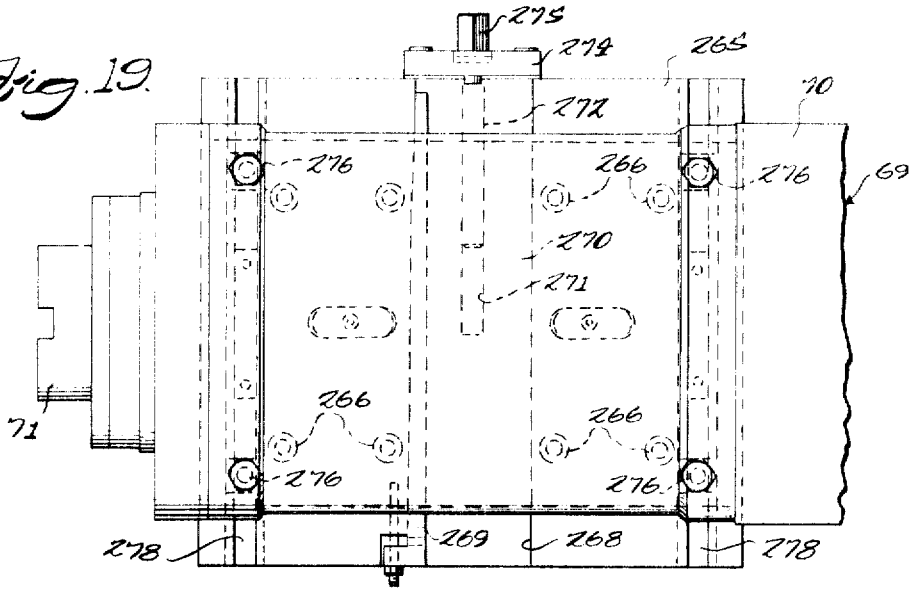
FIGS. 19, 20 and 21 are enlarged, fragmentary elevation, plan and end views, respectively, showing the headstock offset adjustment.

In order to provide a further adjustment of the cutter to meet the requirements of particular workpieces, an arrangement is interposed between the headstock and the headstock depth slide 249 (FIGS. 18 to 21) to permit offsetting of the cutter relative to the vertical swivel axis A—A. Such offset adjustment is manual in the present instance. It is obtained by means of an adapter plate 265 bolted solidly against the depth slide 249 by means of a series of cap screws 266. The adapter plate has an upright channel 268 with a gib 269 extending along one side thereof. The channel 268 slidably receives a mounting pad 270 integral with the casing of the headstock motor 70. The pad 270 has a tapped bore 271 which is engaged by an adjusting screw 272. The screw 272 is journaled in a bracket 274 fastened to the adapter plate 265 and has a squared upper end 275 for engagement with a wrench or other adjusting tool. The position of the headstock motor 70 relative to the adapter plate 65 and the headstock depth slide 249 may be selectively varied by simply turning the adjusting screw 272. Once such adjustment has been made, the headstock motor may be clamped in place by tightening mounting bolts 276 which engage spaced apart T-slots 278 in the adapter plate 265 (FIGS. 19, 20 and 21).

COUNTERBALANCING

Figure 24:
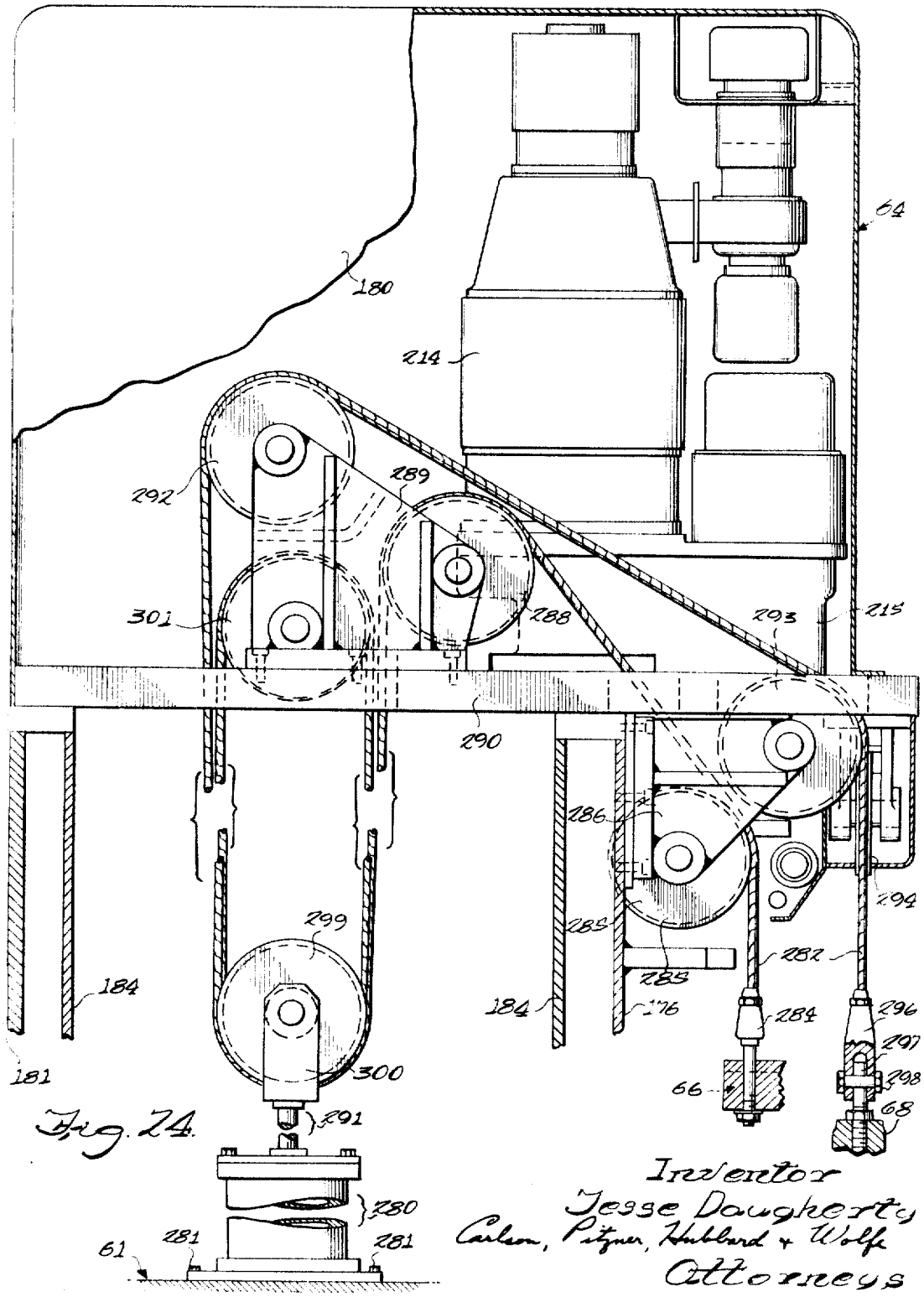
FIG. 24 is an enlarged fragmentary vertical sectional view through the upper portion of the machine column and illustrating the novel counterbalancing mechanism.

Provision is made in the machine 50 for counterbalancing the vertically movable members in a novel and effective manner, as illustrated in FIGS. 3, 22, 23 and 24. This is accomplished in part by constructing the vertical saddle 66 in such a manner that its weight, including the parts stationarily fixed thereon, will be approximately equal to the weight of the vertical swivel saddle 68, head stock 69, and parts associated therewith, and then mechanically connecting these saddles 66, 68 together by means of a flexible tension element. The foregoing is also accomplished in part by utilizing a single loading means acting on such flexible tension element to counterbalance the combined total weight of the saddles 66, 68 and the parts respectively mounted thereon. In this case, the common counterbalancing means is a hydraulic actuator 280 situated within the column 34 and having its lower end securely anchored to the swivel base 61 as by means of cap screws 281 (FIG. 24).

Referring once more to FIG. 12, which shows the rear side of the vertical saddle 66, and to FIG. 24, it will be noted that a flexible tension element in the form of a steel cable 282 is fastened to the upper portion of the vertical saddle 66 by means of an anchor fitting 284. The cable 282 is led upwardly from the vertical saddle and over a guide sheave 285 journaled in a bracket 286 at the top of the column face 176 (FIG. 24). From the sheave 285, the cable 282 is led over a sheave 288 which is journaled in a bracket 289 fixed to a heavy horizontal plate 290 in the top of the column. The cable passes from the sheave 288 to movable element 291 of the hydraulic actuator, and thence to another sheave 292 also journaled in the bracket 289. From the sheave 292, the cable runs over a sheave 293 journaled in the bracket 286, over a sheave 294 perpendicular thereto which is journaled in bracket 295, and thence downwardly to an anchor fitting 296. The latter has a bifurcated lower end which engages a swivel eye 297 projecting radially from the upper end of the vertical swivel saddle 68. A bolt or other suitable pivotal connection 298 pivotally connects the anchor fitting 296 with the swivel eye 297.

By reason of the foregoing arrangement, the vertical saddle 66 and vertical swivel saddle 68 not only counterbalance each other but, in addition, their combined weight is most effectively counterbalanced by the hydraulic actuator 280. The latter operates on pressurized oil from the hydraulic system of the machine.

Provision is made for counterbalancing the combined total weight of the vertical saddle 66 and swivel saddle 68 over the entire range of vertical travel of the vertical saddle 66 while minimizing the stroke required of the movable member 291 of the hydraulic actuator 280. This is accomplished by resort to a multiple strand loop in the counterbalancing cable 282. As shown in FIG. 24, a double sheave 299 is journaled in bifurcated upper end 300 of the movable member 291 and an intermediate sheave 301 is journaled in the bracket 289.

The cable 282 passes from the sheave 288 downwardly and into the first groove of the double sheave 299, thence passing upwardly over the intermediate sheave 301 and then downwardly again but then into the second groove of sheave 299. From here the cable is led up over the sheave 292 and, as described earlier herein, ultimately to the vertical swivel saddle 68.

THE PROFILING TRACER ASSEMBLY

The profiling tracer assembly 74 (FIGS. 1, 3, and 31 to 34), is adapted to control the vertical motion of the saddle 66 along the column 64 and the horizontal motion of the sliding base 59 along the fixed base 58. When the machine is operating on tracer control, follower 305 of tracer 306 traverses the profile of the template T and this results in various combinations of these two motions, causing the cutter 72 to generate a similar profile in the workpiece. Moreover, such motions may be of appropriate magnitudes and directions to permit the tracer follower 305 and the cutter 72 to generate a trace through 360°.

The profiling tracer assembly 74 comprises an upstanding support column 308 bolted or otherwise rigidly secured to the upper portion of the vertical saddle 66 (FIGS. 11, 31, 32 and 33). The column 308 is fashioned with a pair of spaced apart upstanding guides 309 which slidably support a mounting bracket 310. The latter may be selectively positioned at various vertical points on the column 308 by means of an adjusting screw 311 and a manually actuated clamp (not shown).

Rigidly fixed to the mounting plate 310 is an arcuate way 312 which carries a tracer swivel saddle 314. The latter is secured against the face of the arcuate way 312 and guided therealong as for example, by means of bearings 315 (FIGS. 31 and 34) which bear against the curved edges of the way 312. The tracer swivel saddle 314 has an upstanding lug 316 which is pivotally connected by means of a pin 318 and spacer 319, with a depending mechanical link 320. At its lower end, the link 320 is pivotally connected to a lug 321 on the vertical swivel saddle 68, thus duplicating vertical swiveling motions of the vertical swivel saddle in the tracer swivel saddle 314. To permit an adjustment in length in the link 320 corresponding to offset adjustment of the headstock 69, or to bring the swivel saddles 68, 314 into parallel alinement, the link 320 is provided with a turnbuckle 322.

Figure 33:
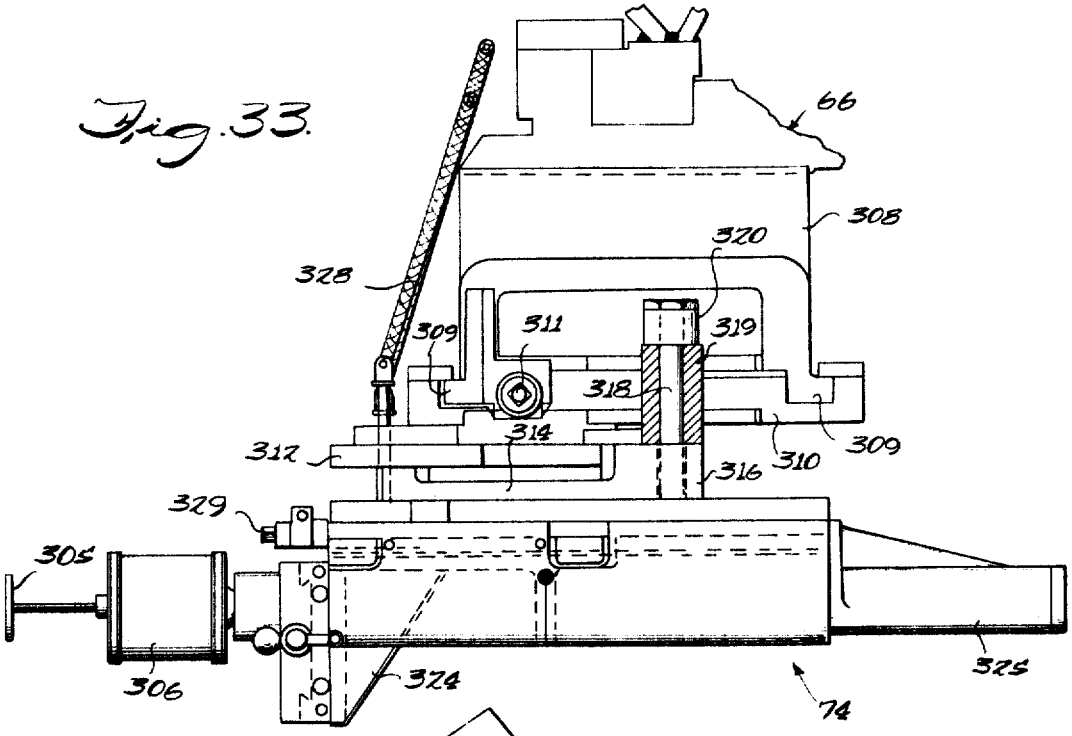
FIGS. 33 and 34 are enlarged plan and side elevational views, respectively, of the profiling tracer unit and its mounting.
Figure 34:
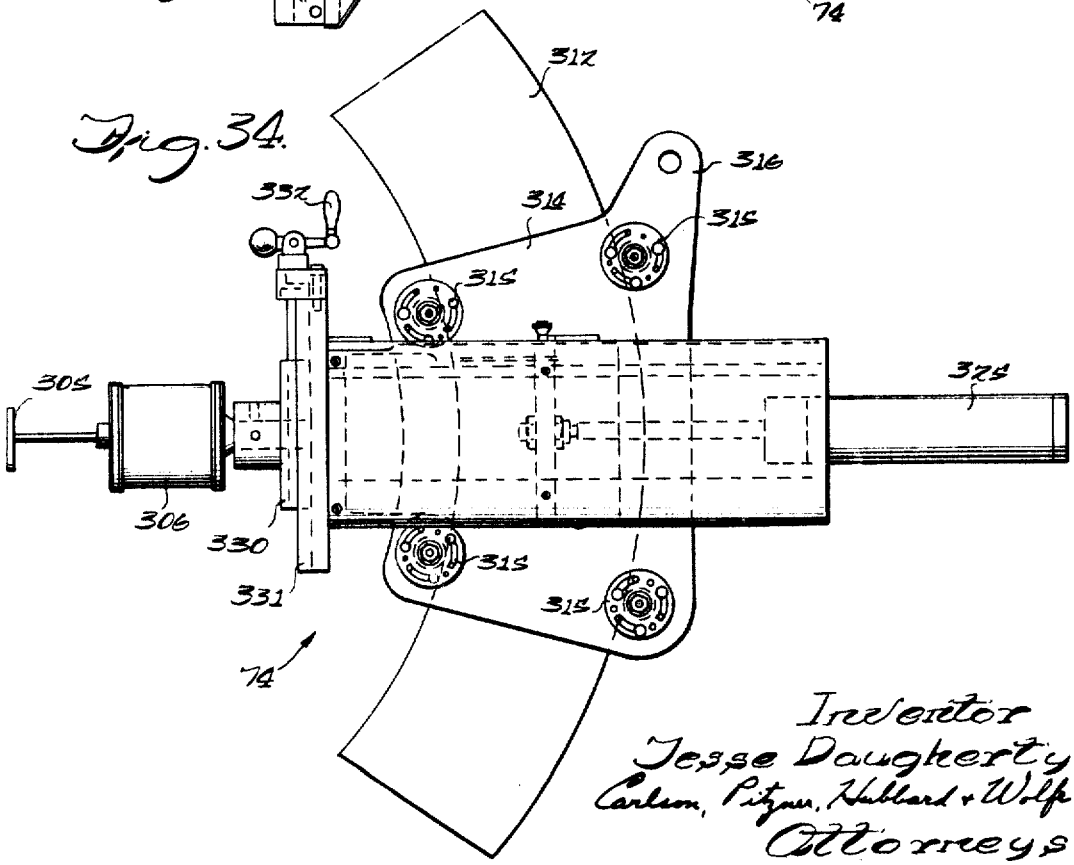

Mounted radially of the tracer swivel saddle 314 and shiftable along a radial line between an extended and a retracted position is a tracer retraction slide 324, the latter being shifted by means of a small hydraulic actuator 325 which is connected to the hydraulic system of the machine by means of conduits 326, 328. The outer extremity of movement of the retraction slide 324 may be selectively varied by means of adjusting screw 329 (FIG. 33). Adjacent its outer end, the retraction slide has mounted thereon a relatively small vertical slide 330 which carries the tracer 306. The slide 330 may be adjusted along guides 331 by means of hand crank 332. The hand crank may be used to compensate for the amount of offset that is given to the headstock.

THE SWIVEL TRACER ASSEMBLY

Figure 30:
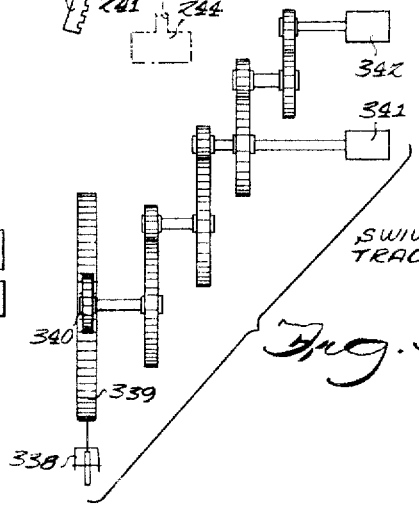
FIG. 30 is a diagrammatic view illustrating a typical gear train between a tracer of the rack and pinion type and certain associated selsyn motors.
Figure 32:
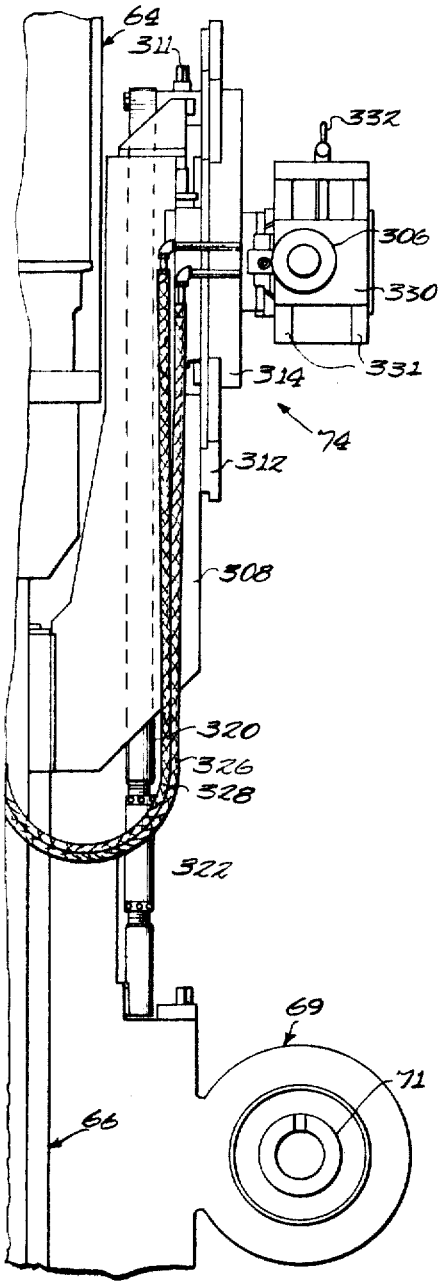
FIG. 32 is an end elevation of the unit shown in FIG. 31.
Figure 31:
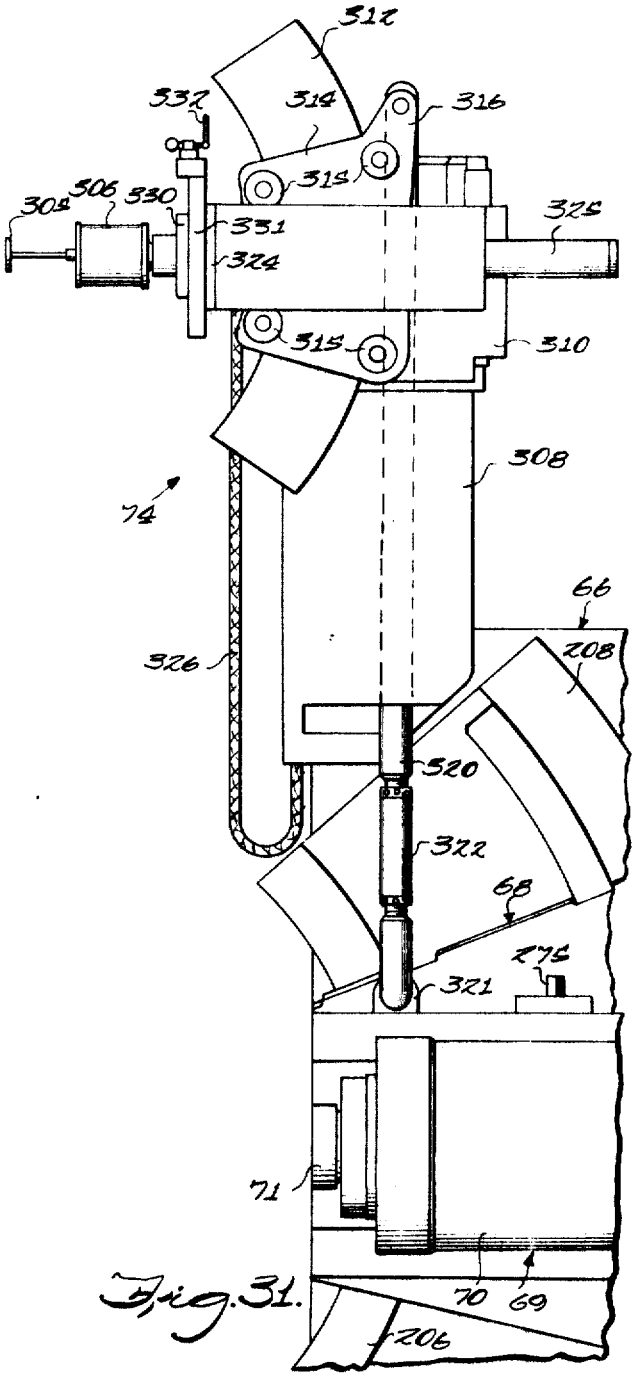
FIG. 31 is a side elevation of the profiling tracer unit mounted on the upper portion of the machine column.

The swivel tracer assembly 75 (FIGS. 1, 3 and 35 to 37) is adapted to control the horizontal and the vertical swiveling motions of the headstock and cutter by controlling the horizontal swiveling motion of the swivel base 61 and the vertical swiveling motion of the vertical swivel saddle 68. In the present instance, this is accomplished through a pair of template operated rack and pinion tracer units 335, 336 mounted on the side of the machine remote from the cutter 72. Each of these tracer units includes a follower 338 which reciprocates a small rack 339, shown diagrammatically in FIG. 30. The displacements of the rack are transmitted to a gear train via a pinion 340, and thence to a selsyn control which in this case includes low speed and high speed selsyn units 341 and 342. These units transmit signals to appropriate controls in the main power and control panel 76 which correspondingly govern the swiveling motors 141 and 214 respectively associated with the swivel base 61 and the vertical swivel saddle 68.

Figure 35:
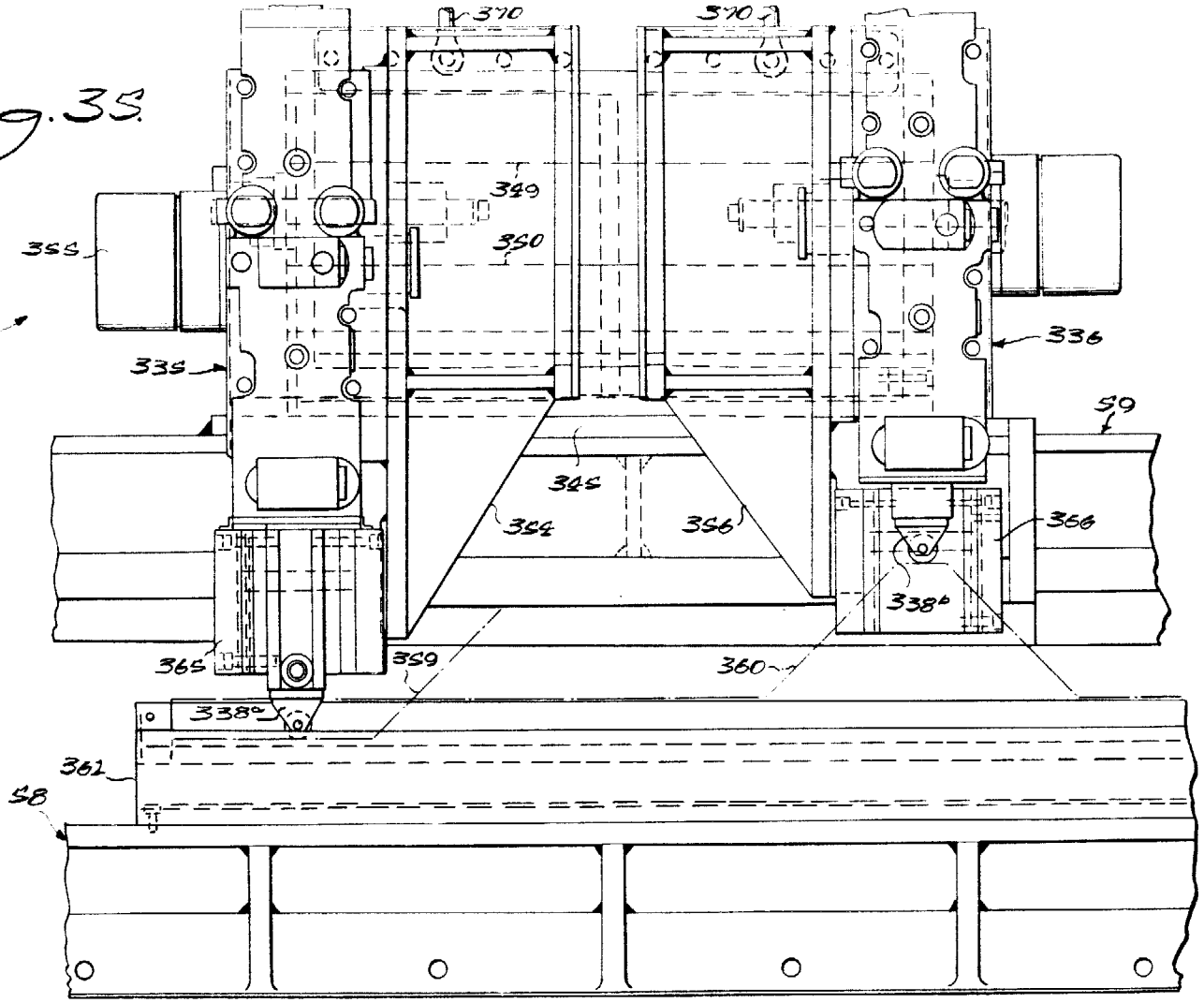
FIGS. 35 and 36 are, respectively, side elevation and plan views of the swivel tracer devices and their associated mountings.
Figure 36:
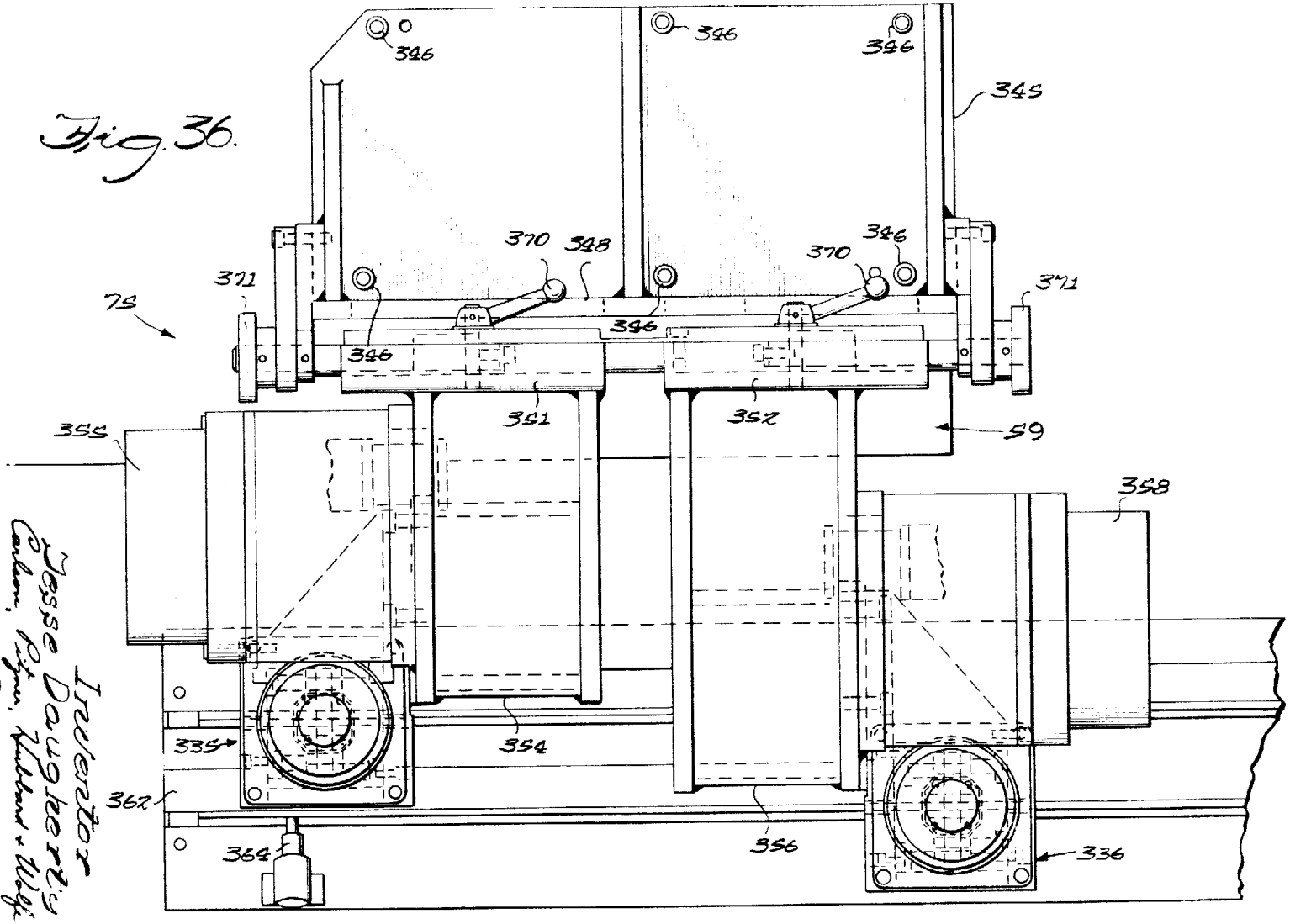
Figure 37:
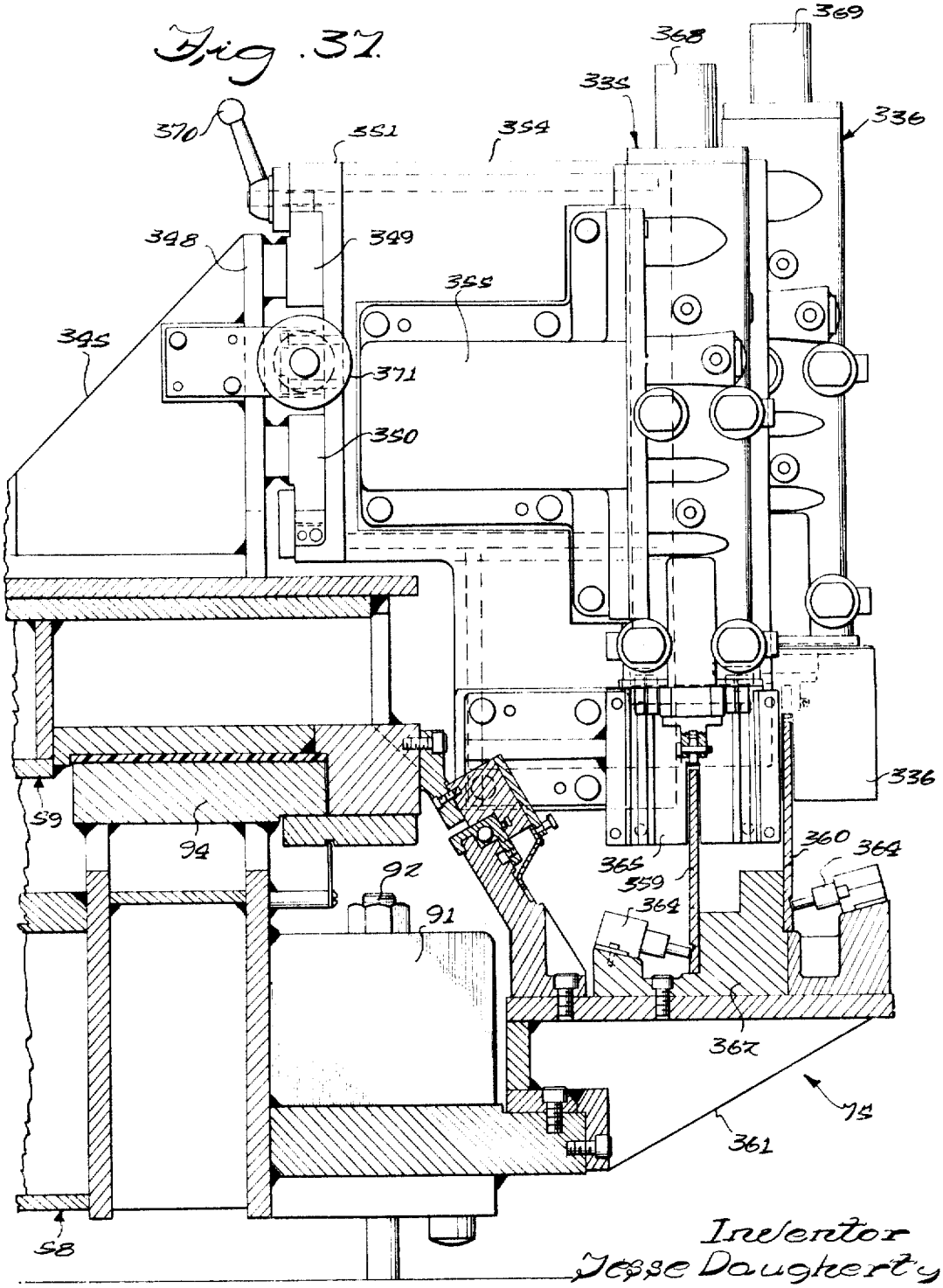
FIG. 37 is an end elevational view of the swivel tracer units shown in FIGS. 35 and 36, but with certain neighboring portions of the fixed and sliding bases shown in transverse section.

Referring in greater detail to FIGS. 35, 36 and 37, it will be noted that the swivel tracer assembly 75 is supported by means of a relatively heavy overhanging mounting bracket 345 anchored to the sliding base 59 as by means of cap screws 346. At its outboard end, the bracket 345 has an upstanding wall 348 which is provided with a pair of vertically spaced, horizontal guide ways 349, 350. Mounted in longitudinally spaced relation on the guide ways 349, 350 are a pair of slides 351 and 352. Within the limits allowed by the longitudinal dimensions of the parts, the slides 351, 352 are selectively positionable along the guide ways. Projecting horizontally from the slide 351 is a rigid, box-like frame 354 which carries the tracer unit 335 and a housing 355 which encloses the associated gear train and selsyn units 341, 342 shown diagrammatically in FIG. 30. For setting-up purposes, the tracer unit 335 may be horizontally and vertically adjustable with respect to the frame 354. A frame 356, similar in construction to the frame 354 but somewhat longer, is fixed to the slide 352 and projects outwardly therefrom. The tracer 336 is carried by the frame 356 and its associated selsyn units and gear train are enclosed within housing 358 also carried by the frame 356. The tracer unit 336 may also have horizontal and vertical adjustments with respect to its frame 356.

Operatively associated with the tracer units 335, 336 are control templates 359, 360 which in the present instance happen to be of the straight line type. The template 359, associated with the tracer unit 335, has its top edge formed so as to generate swiveling signals for the swivel base 61, for example, in properly timed relation to the signals produced by the profiling tracer 306. By the same token, the template 360 operates the tracer unit 336 and may be contoured to produce swiveling signals for the vertical swivel saddle 68, also in timed relation to the signals produced by the profiling tracer 306.

The templates 359, 360 (FIGS. 1, 3, 4, and 35 to 37) are disposed longitudinally of the fixed base 58 and supported on a cantilever bracket 361 situated on the side of the fixed base remote from the cutter 72. At longitudinally spaced inervals, the templates 359, 360 are secured against a spacer block 362 as by means of clamps 364 (FIG. 37). When the templates 359, 360 and the tracer units 335, 336 are in properly adjusted, operative position, each template registers with a slot in a corresponding one in a pair of guide head 365, 366 associated with respective ones of the tracers 335, 336. Moreover, as the tracers traverse the templates due to the motion of the sliding base 59 along the fixed base 58, the projections on the templates will actually enter these slots. Follower 338A of tracer unit 335 is biased downwardly so as to remain in contact with the upper edge of the template 359 during such traversing movement, this being accomplished by means of a small hydraulic cylinder 368 at the top of the tracer unit 355. A similar hydraulic cylinder 369 serves to bias follower 338B into continuous contact with the top of the template 360.

In order ot provide a so-called "zero adjustment" of the tracers and their respective templates or, in other words, to adjust each tracer into proper phase longitudinally of its associated template, provision is made for precisely locating the tracer slides 351, 352 along their guide ways 349, 350. This is accomplished by manually shifting each of the slides 351, 352 until its respective tracer unit has been brought into approximate position with respect to the template. The slide is then clamped by tightening a handle 370 provided for this purpose. Final positioning of either slide is then accomplished by means of a micrometer screw which is actuated by a knob 371, one such knob being located at either end of the mouting bracket 345.

MODIFIED SWIVEL TRACER ASSEMBLY

The swivel tracer assembly of the machine 50 may be modified so as to operate on "full area template control." This term means that swivel signals are generated throughout a 360° trace of the cutter 72 without necessity for stopping the machine after the first 180° of the trace have been completed and installing a new template for the remainder of the trace. Straight line templates, such as the templates 359, 360 will provide signals for only 180° of a cutter trace, in other words, only for machining the top half of the workpiece. Swiveling signals for the trace required for the bottom half of the workpiece must then be derived from another straight line template.

Full area template control in the machine 50 may be achieved by mounting the swivel tracer units 335, 336 and their slides 351, 352 on a vertically disposed tracer column situated on the sliding base 59 in place of the mounting bracket 345. The tracer units 335, 336 and their slides are moved vertically of the tracer column in timed relation with the movements of the vertical saddle 66. This is accomplished by driving the tracer slides by means of a vertically disposed feed screw in the tracer column, such feed screw being driven synchronously with the elevating screw 190 of the vertical saddle.

The templates for tracers arranged as just described are of the "wrap around" type. They are formed by figuratively "wrapping" a metal band around the profile template T, joining the ends of the band together to form a closed loop, removing the closed loop from the profile template, and then contouring one side edge of the loop to define the desired swiveling signals to be picked up by an associated tracer unit. Instead of being mounted on a bracket like the templates 359, 360, the wrap around templates are mounted on a vertical fixture similar to the fixture 51 and situated on the opposite side of the machine from the fixture 51.

I claim as my invention:

1. A floor type contour milling machine comprising, in combination a relatively long fixed base, a sliding base mounted on said fixed base for reciprocation therealong and having an upper horizontally extending surface, a *generally sector shaped* horizontal swivel base mounted on said upper surface and movable in an arcuate path thereon *about a vertical axis* relative to said sliding base, an upstanding, *susbtantially triangular shaped* column fixed to said swivel base, a vertical saddle mounted on said column for reciprocation vertically thereof, a vertical swivel saddle mounted on said vertical saddle and movable in an arcuate path thereon *about a horizontal axis*, a headstock *including means for receiving a cutter* mounted on said vertical swivel saddle *with said horizontal axis and said vertical axis intersecting and passing through said cutter mounted in the headstock*, a profiling tracer assembly for controlling the reciprocation of said sliding base and of said vertical saddle, and a swivel tracer assembly for controlling the arcuate movement of said swivel base and of said vertical swivel saddle.

2. A floor type contour milling machine comprising the combination of a relatively long fixed base, a sliding base mounted on said fixed base for reciprocation therealong and having an upper horizontally extending surface, a power drive for imparting said reciprocation to said sliding base, a horizontal *generally sector shaped* swivel base mounted on said upper surface and movable in an arcuate path thereon *about a vertical axis* relative to said sliding base, a power drive for imparting arcuate movement to said swivel base, an upstanding column fixed to said swivel base, *said column being substantially triangular in cross section,* a vertical saddle mounted on said column for reciprocation vertically thereof, a power drive for imparting said reciprocation to said vertical saddle, a vertical swivel saddle mounted on said vertical saddle and movable in an arcuate path thereon *about a horizontal axis,* a power drive for imparting arcuate movement to said vertical swivel saddle, a headstock *adapted to receive a cutter* mounted on said swivel saddle *with the cutter passing through the intersection of said horizontal and vertical axes,* a profiling tracer assembly for controlling said power drives of said sliding base and of said vertical saddle, and a swivel tracer assembly for controlling said power drives of said swivel base and of said vertical swivel saddle.

3. A floor type contour milling machine comprising, in combination, a fixed base, a sliding base mounted on said fixed base for reciprocation therealong and having an upper horizontally extending surface, a power drive for imparting said reciprocation to said sliding base, a horizontal *sector shaped* swivel base mounted on said upper surface and movable in an arcuate path thereon *about a vertical axis* relative to said sliding base, a power drive for imparting arcuate movement to said swivel base, an upstanding *substantially triangular shaped* column fixed to said swivel base, a vertical saddle mounted on said column for reciprocation vertically thereof, a power drive for imparting said reciprocation to said vertical saddle, a vertical swivel saddle mounted on said vertical saddle and movable in an arcuate path thereon *about a horizontal axis,* a power drive for imparting arcuate movement to said vertical swivel saddle, a headstock *adapted to receive a cutter* mounted on said vertical swivel saddle *with said cutter passing through the intersection of said horizontal and vertical axis,* a profiling tracer mounted on said vertical saddle and movable bodily therewith, said profiling tracer being adapted to control said power drives of said sliding base and said vertical saddle, and a pair of swivel tracers mounted on said sliding base and movable bodily therewith, one of said swivel tracers being adapted to control said power drive of said swivel base, and the other of said swivel tracers being adapted to control said power drive of said vertical swivel saddle.

4. A floor type contour milling machine comprising, in combination a fixed base, a sliding base mounted for longitudinal sliding motion on said fixed base and having an upper horizontally extending surface, a *generally sector shaped* swivel base mounted for arcuate swiveling motion on said upper surface, an upstanding *substantially triangular shaped* column fixed to said swivel base, a vertical saddle mounted on said column for reciprocating motion vertically thereof, a vertical swivel saddle mounted on said vertical saddle for arcuate swiveling motion thereon, a headstock mounted on said vertical swivel saddle for radial depth adjusting motion relative thereto, power drives for effecting said motions, a profiling tracer assembly for controlling the motions of said sliding base, said vertical saddle, and said headstock, a swivel tracer assembly for controlling the motions of said swivel base and said swivel saddle, and controls interposed between said tracer assemblies and said power drives providing for simultaneous tracer control of any four out of five said motions.

5. In a floor type contour milling machine, the combination of an upright supporting column, *said column being substantially triangular shaped,* a vertical saddle mounted on said column and reciprocable vertically thereof, a vertical swivel saddle mounted on said vertical saddle for arcuate movement relative thereto, a headstock carried by said vertical swivel saddle, a tracer swivel saddle movable bodily with said vertical saddle and also disposed for arcuate movement relative thereto, a tracer unit mounted on said tracer swivel saddle, [and] a mechanical link pivotally connected between said vertical swivel saddle and said tracer swivel saddle for synchronizing the swivel motion of both *and said link including means for adjusting the length thereof for varying the positioning of tracer swivel saddle with respect to said vertical swivel saddle.*

6. In a floor type contour milling machine, the combination comprising an upright *substantially triangular shaped* supporting column, a vertical saddle mounted on said column and reciprocable vertically thereof, a vertical swivel saddle mounted on said vertical saddle for arcuate movement relative thereto, a headstock carried by said vertical swivel saddle, a tracer mounted on said vertical saddle in spaced relation with said headstock and in alinement with a common upright axis, means connecting said tracer with said vertical swivel saddle for swiveling said tracer in unison with the swiveling motion of said vertical swivel saddle, a *generally sector shaped* swivel base supporting said column, and means mounting said swivel base for pivotal movement of itself, said headstock and said tracer about said common upright axis.

7. A floor type contour milling machine comprising, in combination, a relatively long fixed base, a sliding base mounted on said fixed base for reciprocation therealong and having an upper horizontally extending surface, a power drive for imparting said reciprocation to said sliding base, a horizontal *generally sector shaped* swivel base mounted on said upper surface and movable in an arcuate path thereon *about a vertical axis* relative to said sliding base, a power drive for imparting arcuate movement to said swivel base, an upstanding column fixed to said swivel base, a vertical saddle mounted on said column for reciprocation, vertically thereof, a power drive for imparting said reciprocation to said vertical saddle, a vertical swivel saddle mounted on said vertical saddle and movable in an arcuate path thereon, on power drive for imparting arcuate movement to said vertical swivel saddle, a headstock *adapted to receive a cutter* mounted on said vertical swivel saddle *and movable in an arcuate path about a horizontal axis, said horizontal axis intersecting with said vertical axis along said cutter* and a pilot control system including a source of signals for controlling said power drive.

8. In a floor type contour milling machine, the combination comprising, a fixed base, a sliding base reciprocally mounted on said fixed base and having an upper horizontally extending surface, a horizontal *generally sector shaped* swivel base mounted on said upper surface for arcuate movement relative to said sliding base, a *substantially triangular shaped* column fixed to said swivel base, a vertical saddle reciprocally mounted on said column, a vertical swivel saddle mounted on said vertical saddle for arcuate movement relative thereto, a headstock carried by said vertical swivel saddle, power means for moving said saddles and said bases relative to each other, and means including a source of signals for controlling said power means.

9. A floor type contour milling machine comprising, in combination, a relatively long fixed base carrying a pair of laterally spaced horizontal ways defining a runway, a generally rectangular sliding base element mounted on said fixed base for reciproction along said runway and having a substantially horizontal upper surface, said sliding base carrying on its upper surface a pair of spaced arcuate ways, a generally horizontal swivel base element mounted on said arcuate ways and movable in an arcuate path therealong, a pivot shaft on said sliding base positioned at the geometric center of said arcuate ways, means journaling said swivel base on said shaft for swiveling movement relative to said sliding base and along said arcuate ways, a generally vertical column fixed to said swivel base, a pair of spaced vertical ways secured to and extending along said column, a vertical saddle element mounted on said vertical ways for reciprocation vertically thereof and having a substantially vertical face carrying a pair of spaced arcuate ways, a vertical swivel saddle element mounted on said vertical arcuate ways for movement in an arcuate path relative to said vertical saddle, a pair of vertically spaced horizontally extending parallel guide ways on said vertical swivel saddle, a slide element mounted on said guide ways for reciprocating horizontally thereof. and a power headstock mounted on said slide, means for moving said elements relative to each other to position said headstock, a source of pilot control signals, and means operative in response to signals from said source for controlling the operation of said element moving means.

References Cited

The following references, cited by the Examiner, are of record in the patented file of this patent or the original patent.

UNITED STATES PATENTS

| | | |
|---|---|---|
| 2,278,262 | 3/1942 | Hoelscher. |
| 2,472,151 | 6/1949 | Ewaldson. |
| 2,660,930 | 12/1953 | De Vlieg et al. |
| 2,674,160 | 4/1954 | Martellotti. |
| 2,675,743 | 4/1954 | Martellotti et al. |
| 2,753,244 | 7/1956 | Dubosclard. |
| 2,793,568 | 5/1957 | Martellotti. |

OTHER REFERENCES

Publication: "Variax," Giddings & Lewis printed brochure, September 1953. (Copy in application as Annex A.)

GERALD A. DOST, *Primary Examiner.*